US011995962B2

(12) United States Patent
Acres

(10) Patent No.: US 11,995,962 B2
(45) **Date of Patent: *May 28, 2024**

(54) METHOD FOR OPERATING A GAMING DEVICE THAT DISPLAYS SYMBOLS

(71) Applicant: Acres Technology, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 284 days.

This patent is subject to a terminal disclaimer.

(21) Appl. No.: 17/510,873

(22) Filed: Oct. 26, 2021

(65) Prior Publication Data

US 2022/0051530 A1 Feb. 17, 2022

Related U.S. Application Data

(63) Continuation of application No. 16/041,886, filed on Jul. 23, 2018, now Pat. No. 11,176,783, which is a (Continued)

(51) Int. Cl.
*G07F 17/34* (2006.01)
*G07F 17/32* (2006.01)

(52) U.S. Cl.
CPC .............. *G07F 17/34* (2013.01); *G07F 17/32* (2013.01); *G07F 17/3211* (2013.01); (Continued)

(58) Field of Classification Search
CPC .. G07F 17/34; G07F 17/3232; G07F 17/3244; G07F 17/3267; G07F 17/32; G07F 17/3211; G07F 17/3225
See application file for complete search history.

(56) References Cited

U.S. PATENT DOCUMENTS

| | | | |
|---|---|---|---|
| 2,669,389 A | 2/1954 | Mesi et al. | |
| 3,124,355 A | 3/1964 | Mentzer et al. | |

(Continued)

FOREIGN PATENT DOCUMENTS

| | | |
|---|---|---|
| CA | 2754756 | 1/2007 |
| CN | 101043922 A | 9/2007 |

(Continued)

OTHER PUBLICATIONS

U.S. Appl. No. 12/616,070, filed Nov. 10, 2009 to Acres.

(Continued)

*Primary Examiner* — Khiem D Nguyen
(74) *Attorney, Agent, or Firm* — Ballard Spahr LLP

(57) ABSTRACT

Embodiments of the present invention are directed to a method for operating a gaming device and a computer readable storage medium. The gaming device has at least one winning event and at least one related award that is generated according to a set of rules associated with the game. The game is driven to present a predefined winning outcome and an award is generated as if the winning event and award were generated according to the rules. Also provided are rules and/or conditions for determining when to generate the predefined wining event, including rules that take into account player value to the casino and game volatility preference.

20 Claims, 12 Drawing Sheets

Related U.S. Application Data continuation of application No. 15/297,743, filed on Oct. 19, 2016, now Pat. No. 10,032,341, which is a continuation of application No. 14/099,445, filed on Dec. 6, 2013, now Pat. No. 9,501,907, which is a continuation of application No. 12/406,458, filed on Mar. 18, 2009, now Pat. No. 8,602,866.

(60) Provisional application No. 61/156,767, filed on Mar. 2, 2009, provisional application No. 61/038,548, filed on Mar. 21, 2008.

(52) U.S. Cl.
CPC ...... *G07F 17/3225* (2013.01); *G07F 17/3232* (2013.01); *G07F 17/3244* (2013.01); *G07F 17/3267* (2013.01)

(56) References Cited

U.S. PATENT DOCUMENTS

| | | | |
|---|---|---|---|
| 3,124,674 | A | 3/1964 | Edward et al. |
| 3,684,290 | A | 8/1972 | Wayne |
| 3,727,213 | A | 4/1973 | Kurtenbach |
| 3,751,040 | A | 8/1973 | Carey |
| 4,240,635 | A | 12/1980 | Brown |
| 4,254,404 | A | 3/1981 | White |
| 4,433,844 | A | 2/1984 | Hooker et al. |
| 4,624,459 | A | 11/1986 | Kaufman |
| 4,657,256 | A | 4/1987 | Okada |
| 4,836,546 | A | 6/1989 | DiRe et al. |
| 4,887,813 | A | 12/1989 | Chiles, III et al. |
| 5,022,653 | A | 6/1991 | Suttle et al. |
| 5,024,439 | A | 6/1991 | Okada |
| 5,027,102 | A | 6/1991 | Sweeny |
| 5,031,914 | A | 7/1991 | Rosenthal |
| 5,078,405 | A | 1/1992 | Jones et al. |
| 5,152,529 | A | 10/1992 | Okada |
| 5,178,395 | A | 1/1993 | Lovell |
| 5,221,083 | A | 6/1993 | Dote |
| 5,265,880 | A | 11/1993 | Maksymec |
| 5,342,049 | A | 8/1994 | Wichinsky et al. |
| 5,364,104 | A | 11/1994 | Jones et al. |
| 5,377,973 | A | 1/1995 | Jones et al. |
| 5,380,008 | A | 1/1995 | Mathis et al. |
| 5,490,670 | A | 2/1996 | Hobert |
| 5,536,016 | A | 7/1996 | Thompson |
| 5,564,700 | A | 10/1996 | Celona |
| 5,584,485 | A | 12/1996 | Jones et al. |
| 5,586,766 | A | 12/1996 | Forte et al. |
| 5,655,961 | A | 8/1997 | Acres et al. |
| 5,674,128 | A | 10/1997 | Holch et al. |
| 5,695,402 | A | 12/1997 | Stupak |
| 5,697,844 | A | 12/1997 | Kohorn |
| 5,743,798 | A | 4/1998 | Adams et al. |
| 5,758,875 | A | 6/1998 | Giacalone, Jr. |
| 5,766,076 | A | 6/1998 | Pease et al. |
| 5,816,918 | A | 10/1998 | Kelly et al. |
| 5,830,064 | A | 11/1998 | Bradish et al. |
| 5,836,816 | A | 11/1998 | Bruin et al. |
| 5,836,817 | A | 11/1998 | Acres et al. |
| 5,851,147 | A | 12/1998 | Stupak et al. |
| 5,910,048 | A | 6/1999 | Feinberg |
| 5,913,726 | A | 6/1999 | Jones et al. |
| 5,934,998 | A | 8/1999 | Forte et al. |
| 5,941,770 | A | 8/1999 | Miers et al. |
| 5,960,406 | A | 9/1999 | Rasansky et al. |
| 5,984,779 | A | 11/1999 | Bridgeman et al. |
| 6,003,013 | A | 12/1999 | Boushy et al. |
| 6,012,983 | A | 1/2000 | Walker et al. |
| 6,024,642 | A | 2/2000 | Stupak |
| 6,030,109 | A | 2/2000 | Lobsenz |
| 6,032,955 | A | 3/2000 | Luciano et al. |
| 6,045,130 | A | 4/2000 | Jones et al. |
| 6,048,272 | A | 4/2000 | Tsujita |
| 6,059,659 | A | 5/2000 | Busch et al. |
| 6,077,163 | A | 6/2000 | Walker et al. |
| 6,086,477 | A | 7/2000 | Walker et al. |
| 6,106,395 | A | 8/2000 | Begis |
| 6,110,041 | A | 8/2000 | Walker et al. |
| 6,110,043 | A | 8/2000 | Olsen |
| 6,135,884 | A | 10/2000 | Hedrick et al. |
| 6,146,273 | A | 11/2000 | Olsen |
| 6,165,071 | A | 12/2000 | Weiss |
| 6,168,521 | B1 | 1/2001 | Luciano et al. |
| 6,183,362 | B1 | 2/2001 | Boushy |
| 6,186,892 | B1 | 2/2001 | Frank et al. |
| 6,186,893 | B1 | 2/2001 | Walker et al. |
| 6,196,918 | B1 | 3/2001 | Miers et al. |
| 6,203,429 | B1 | 3/2001 | Demar et al. |
| 6,210,276 | B1 | 4/2001 | Mullins |
| 6,217,448 | B1 | 4/2001 | Olsen |
| 6,224,482 | B1 | 5/2001 | Bennett |
| 6,234,900 | B1 | 5/2001 | Cumbers |
| 6,254,483 | B1 | 7/2001 | Acres |
| 6,264,560 | B1 | 7/2001 | Goldberg et al. |
| 6,270,409 | B1 | 8/2001 | Shuster |
| 6,289,382 | B1 | 9/2001 | Bowman-Amuah |
| 6,293,866 | B1 | 9/2001 | Walker et al. |
| 6,293,868 | B1 | 9/2001 | Bernard |
| 6,302,793 | B1 | 10/2001 | Fertitta, III et al. |
| 6,315,662 | B1 | 11/2001 | Jorasch et al. |
| 6,315,666 | B1 | 11/2001 | Mastera et al. |
| 6,319,122 | B1 | 11/2001 | Packes et al. |
| 6,319,125 | B1 | 11/2001 | Acres |
| 6,336,859 | B2 | 1/2002 | Jones et al. |
| 6,347,996 | B1 | 2/2002 | Gilmore et al. |
| 6,364,314 | B1 | 4/2002 | Canterbury |
| 6,364,768 | B1 | 4/2002 | Acres et al. |
| 6,368,216 | B1 | 4/2002 | Hedrick |
| 6,371,852 | B1 | 4/2002 | Acres |
| 6,375,567 | B1 | 4/2002 | Acres |
| 6,390,917 | B1 | 5/2002 | Walker et al. |
| 6,425,823 | B1 | 7/2002 | Byrne |
| 6,428,002 | B1 | 8/2002 | Baranauskas |
| 6,443,456 | B1 | 9/2002 | Gajor |
| 6,454,648 | B1 | 9/2002 | Kelly et al. |
| 6,457,045 | B1 | 9/2002 | Hanson et al. |
| 6,471,588 | B2 | 10/2002 | Sakamoto |
| 6,485,367 | B1 | 11/2002 | Joshi |
| 6,485,368 | B2 | 11/2002 | Jones et al. |
| 6,508,710 | B1 | 1/2003 | Paravia et al. |
| 6,520,856 | B1 | 2/2003 | Walker et al. |
| 6,537,150 | B1 | 3/2003 | Luciano et al. |
| 6,565,434 | B1 | 5/2003 | Acres |
| 6,565,436 | B1 | 5/2003 | Baerlocher |
| 6,569,013 | B1 | 5/2003 | Taylor |
| 6,575,832 | B1 | 6/2003 | Manfredi et al. |
| 6,592,457 | B1 | 7/2003 | Frohm et al. |
| 6,599,186 | B1 | 7/2003 | Walker et al. |
| 6,599,193 | B2 | 7/2003 | Baerlocher et al. |
| 6,606,615 | B1 | 8/2003 | Jennings et al. |
| 6,620,046 | B2 | 9/2003 | Rowe |
| 6,634,922 | B1 | 10/2003 | Driscoll et al. |
| 6,645,068 | B1 | 11/2003 | Kelly et al. |
| 6,648,757 | B1 | 11/2003 | Slomiany et al. |
| 6,652,378 | B2 | 11/2003 | Cannon et al. |
| 6,656,047 | B1 | 12/2003 | Tarantino et al. |
| 6,695,700 | B2 | 2/2004 | Walker et al. |
| 6,697,165 | B2 | 2/2004 | Wakai et al. |
| 6,702,670 | B2 | 3/2004 | Jasper et al. |
| 6,709,331 | B2 | 3/2004 | Berman |
| 6,712,693 | B1 | 3/2004 | Hettinger |
| 6,712,695 | B2 | 3/2004 | Mothwurf et al. |
| 6,722,985 | B2 | 4/2004 | Criss-Puszkiewicz et al. |
| 6,749,510 | B2 | 6/2004 | Giobbi |
| 6,751,657 | B1 | 6/2004 | Zothner |
| 6,755,420 | B2 | 6/2004 | Colton |
| 6,758,754 | B1 | 7/2004 | Avanchy et al. |
| 6,760,595 | B2 | 7/2004 | Inselberg |
| 6,780,104 | B2 | 8/2004 | Fox |
| 6,786,824 | B2 | 9/2004 | Cannon |
| 6,800,026 | B2 | 10/2004 | Cannon |
| 6,800,027 | B2 | 10/2004 | Giobbi et al. |

(56) References Cited

U.S. PATENT DOCUMENTS

| | | | |
|---|---|---|---|
| 6,802,778 | B1 | 10/2004 | Lemay et al. |
| 6,811,482 | B2 | 11/2004 | Letovsky |
| 6,811,486 | B1 | 11/2004 | Luciano, Jr. |
| 6,860,808 | B2 | 3/2005 | Levitan |
| 6,860,810 | B2 | 3/2005 | Cannon et al. |
| 6,939,227 | B2 | 9/2005 | Jorasch et al. |
| 6,944,509 | B2 | 9/2005 | Altmaier et al. |
| 6,948,171 | B2 | 9/2005 | Dan et al. |
| 6,965,868 | B1 | 11/2005 | Bednarek |
| 6,973,665 | B2 | 12/2005 | Dudkiewicz et al. |
| RE38,982 | E | 2/2006 | Forte et al. |
| 6,997,380 | B2 | 2/2006 | Safaei et al. |
| 6,998,806 | B2 | 2/2006 | Suzuki |
| 7,037,195 | B2 | 5/2006 | Schneider et al. |
| 7,048,628 | B2 | 5/2006 | Schneider |
| 7,056,210 | B2 | 6/2006 | Bansemer et al. |
| 7,069,232 | B1 | 6/2006 | Fox et al. |
| 7,090,579 | B2 | 8/2006 | Tarantino |
| 7,094,149 | B2 | 8/2006 | Walker et al. |
| 7,094,150 | B2 | 8/2006 | Ungaro et al. |
| 7,103,560 | B1 | 9/2006 | Fox et al. |
| 7,131,908 | B2 | 11/2006 | Baerlocher |
| 7,144,322 | B2 | 12/2006 | Gomez et al. |
| 7,169,052 | B2 | 1/2007 | Beaulieu et al. |
| 7,175,521 | B2 | 2/2007 | McClintic |
| 7,182,690 | B2 | 2/2007 | Giobbi et al. |
| 7,184,965 | B2 | 2/2007 | Fox et al. |
| 7,186,181 | B2 | 3/2007 | Rowe |
| 7,192,346 | B2 | 3/2007 | Mathis |
| 7,195,243 | B2 | 3/2007 | Kenny et al. |
| 7,201,654 | B1 | 4/2007 | Jarvis et al. |
| 7,251,805 | B2 | 7/2007 | Koo |
| 7,300,351 | B2 | 11/2007 | Thomas |
| 7,329,185 | B2 | 2/2008 | Conover et al. |
| 7,338,372 | B2 | 3/2008 | Morrow et al. |
| 7,361,089 | B2 | 4/2008 | Daly et al. |
| 7,374,486 | B2 | 5/2008 | Baerlocher |
| 7,384,338 | B2 | 6/2008 | Rothschild et al. |
| 7,406,516 | B2 | 7/2008 | Davis et al. |
| 7,410,422 | B2 | 8/2008 | Fine |
| 7,416,186 | B2 | 8/2008 | Walker et al. |
| 7,458,892 | B2 | 12/2008 | Walker et al. |
| 7,500,916 | B2 | 3/2009 | Lieberman et al. |
| 7,559,837 | B1 | 7/2009 | Yoseloff et al. |
| 7,594,851 | B2 | 9/2009 | Falconer |
| 7,601,060 | B2 | 10/2009 | Baerlocher et al. |
| 7,628,691 | B2 | 12/2009 | Luciano et al. |
| 7,674,180 | B2 | 3/2010 | Graham et al. |
| 7,717,788 | B2 | 5/2010 | Rowe |
| 7,731,579 | B2 * | 6/2010 | Gomez ............... G07F 17/3244 463/16 |
| 7,765,121 | B2 | 7/2010 | Pace et al. |
| 7,775,875 | B2 | 8/2010 | Nguyen et al. |
| 7,775,876 | B2 | 8/2010 | Rowe |
| 7,780,520 | B2 | 8/2010 | Baerlocher |
| 7,811,167 | B2 | 10/2010 | Giobbi et al. |
| 7,846,018 | B2 | 12/2010 | Baerlocher |
| 7,874,911 | B2 | 1/2011 | Walker et al. |
| 7,963,844 | B2 | 6/2011 | Walker et al. |
| 8,002,620 | B2 | 8/2011 | Nicely et al. |
| 8,052,517 | B2 | 11/2011 | Manfredi et al. |
| 8,057,293 | B2 | 11/2011 | Oomori |
| 8,313,369 | B2 | 11/2012 | Acres |
| 8,602,866 | B2 * | 12/2013 | Acres ...................... G07F 17/34 463/20 |
| 8,956,214 | B2 | 2/2015 | Acres |
| 9,501,907 | B2 * | 11/2016 | Acres ...................... G07F 17/34 |
| 9,619,973 | B2 | 4/2017 | Acres |
| 9,659,442 | B2 | 5/2017 | Acres |
| 9,721,423 | B2 | 8/2017 | Acres |
| 9,865,133 | B2 | 1/2018 | Acres |
| 9,997,007 | B2 | 6/2018 | Acres |
| 10,032,341 | B2 * | 7/2018 | Acres .................. G07F 17/3225 |
| 11,176,783 | B2 * | 11/2021 | Acres .................. G07F 17/3244 |
| 2001/0004609 | A1 | 6/2001 | Walker et al. |
| 2001/0024015 | A1 | 9/2001 | Hogan et al. |
| 2001/0046893 | A1 | 11/2001 | Giobbi et al. |
| 2001/0048193 | A1 | 12/2001 | Yoseloff et al. |
| 2002/0013173 | A1 | 1/2002 | Walker et al. |
| 2002/0016202 | A1 | 2/2002 | Fertitta et al. |
| 2002/0019253 | A1 | 2/2002 | Reitzen et al. |
| 2002/0019773 | A1 | 2/2002 | Shibahara |
| 2002/0032052 | A1 | 3/2002 | Levitan |
| 2002/0034981 | A1 | 3/2002 | Hisada |
| 2002/0039923 | A1 | 4/2002 | Cannon et al. |
| 2002/0055381 | A1 | 5/2002 | Tarantino |
| 2002/0086726 | A1 | 7/2002 | Ainsworth |
| 2002/0094855 | A1 | 7/2002 | Berman |
| 2002/0103018 | A1 | 8/2002 | Rommerdahl et al. |
| 2002/0107072 | A1 | 8/2002 | Giobbi |
| 2002/0123376 | A1 | 9/2002 | Walker et al. |
| 2002/0132664 | A1 | 9/2002 | Miller et al. |
| 2002/0142825 | A1 | 10/2002 | Lark et al. |
| 2002/0143652 | A1 | 10/2002 | Beckett |
| 2002/0147040 | A1 | 10/2002 | Walker et al. |
| 2002/0147043 | A1 | 10/2002 | Shulman et al. |
| 2002/0147049 | A1 | 10/2002 | Russell |
| 2002/0152120 | A1 | 10/2002 | Howington |
| 2002/0167126 | A1 | 11/2002 | Da Raedt et al. |
| 2002/0177480 | A1 | 11/2002 | Rowe |
| 2002/0177483 | A1 | 11/2002 | Cannon |
| 2002/0187834 | A1 | 12/2002 | Rowe et al. |
| 2002/0193162 | A1 | 12/2002 | Walker et al. |
| 2002/0196342 | A1 | 12/2002 | Walker et al. |
| 2003/0003988 | A1 | 1/2003 | Walker et al. |
| 2003/0003989 | A1 | 1/2003 | Johnson |
| 2003/0013512 | A1 | 1/2003 | Rowe |
| 2003/0017865 | A1 | 1/2003 | Beaulieu et al. |
| 2003/0032474 | A1 | 2/2003 | Kaminkow |
| 2003/0036425 | A1 | 2/2003 | Kaminkow et al. |
| 2003/0054875 | A1 | 3/2003 | Marks et al. |
| 2003/0054878 | A1 | 3/2003 | Benoy et al. |
| 2003/0054881 | A1 | 3/2003 | Hedrick et al. |
| 2003/0060276 | A1 | 3/2003 | Walker et al. |
| 2003/0064769 | A1 | 4/2003 | Muir |
| 2003/0064771 | A1 | 4/2003 | Morrow et al. |
| 2003/0067116 | A1 | 4/2003 | Colton |
| 2003/0078101 | A1 | 4/2003 | Schneider et al. |
| 2003/0083943 | A1 | 5/2003 | Adams et al. |
| 2003/0087685 | A1 | 5/2003 | Hogan et al. |
| 2003/0092484 | A1 | 5/2003 | Schneider et al. |
| 2003/0100360 | A1 | 5/2003 | Manfredi et al. |
| 2003/0114217 | A1 | 6/2003 | Walker et al. |
| 2003/0119575 | A1 | 6/2003 | Centuori et al. |
| 2003/0135304 | A1 | 7/2003 | Sroub et al. |
| 2003/0144048 | A1 | 7/2003 | Silva |
| 2003/0178774 | A1 | 9/2003 | Marcilio |
| 2003/0186733 | A1 | 10/2003 | Wolf et al. |
| 2003/0187736 | A1 | 10/2003 | Teague et al. |
| 2003/0190944 | A1 | 10/2003 | Manfredi et al. |
| 2003/0195029 | A1 | 10/2003 | Frohm et al. |
| 2003/0199295 | A1 | 10/2003 | Vancura |
| 2003/0199312 | A1 | 10/2003 | Walker et al. |
| 2003/0204474 | A1 | 10/2003 | Capek et al. |
| 2003/0207711 | A1 | 11/2003 | Rowe |
| 2003/0209853 | A1 | 11/2003 | Harris |
| 2003/0211884 | A1 | 11/2003 | Gauselmann |
| 2003/0216169 | A1 | 11/2003 | Walker et al. |
| 2003/0220138 | A1 | 11/2003 | Walker et al. |
| 2003/0220139 | A1 | 11/2003 | Peterson |
| 2003/0220143 | A1 | 11/2003 | Shteyn et al. |
| 2003/0228901 | A1 | 12/2003 | Walker et al. |
| 2003/0232640 | A1 | 12/2003 | Walker et al. |
| 2003/0234489 | A1 | 12/2003 | Okada |
| 2003/0236110 | A1 | 12/2003 | Beaulieu et al. |
| 2004/0002369 | A1 | 1/2004 | Walker et al. |
| 2004/0002377 | A1 | 1/2004 | Staw et al. |
| 2004/0009808 | A1 | 1/2004 | Gauselmann |
| 2004/0029631 | A1 | 2/2004 | Duhamel |
| 2004/0033826 | A1 * | 2/2004 | Berman .............. G07F 17/3244 463/16 |
| 2004/0038735 | A1 | 2/2004 | Steil et al. |
| 2004/0038736 | A1 | 2/2004 | Bryant et al. |
| 2004/0048650 | A1 | 3/2004 | Mierau et al. |

(56) References Cited

U.S. PATENT DOCUMENTS

2004/0053657 A1 3/2004 Fiden et al.
2004/0053681 A1 3/2004 Jordan et al.
2004/0063484 A1 4/2004 Dreaper et al.
2004/0072609 A1 4/2004 Ungaro et al.
2004/0097286 A1* 5/2004 Vancura .................. G07F 17/32 463/26
2004/0103013 A1 5/2004 Jameson
2004/0121833 A1 6/2004 Mezen et al.
2004/0132527 A1* 7/2004 Berman .............. G07F 17/3211 463/20
2004/0142742 A1 7/2004 Schneider et al.
2004/0158536 A1 8/2004 Kowal et al.
2004/0166918 A1 8/2004 Walker et al.
2004/0166940 A1 8/2004 Rothschild
2004/0180722 A1 9/2004 Giobbi
2004/0198485 A1 10/2004 Loose et al.
2004/0203611 A1 10/2004 Laporta et al.
2004/0204213 A1 10/2004 Schugar et al.
2004/0204216 A1 10/2004 Schugar
2004/0204222 A1 10/2004 Roberts
2004/0214637 A1 10/2004 Nonaka
2004/0219967 A1 11/2004 Giobbi et al.
2004/0224750 A1 11/2004 Al-Ziyoud
2004/0229671 A1 11/2004 Stronach et al.
2004/0229683 A1 11/2004 Mothwurf et al.
2004/0229700 A1 11/2004 Cannon et al.
2004/0235542 A1 11/2004 Stronach et al.
2004/0248642 A1 12/2004 Rothschild
2004/0254010 A1 12/2004 Fine
2004/0266517 A1 12/2004 Bleich et al.
2005/0014558 A1 1/2005 Estey
2005/0026674 A1 2/2005 Wolf et al.
2005/0043072 A1 2/2005 Nelson
2005/0043086 A1 2/2005 Schneider
2005/0043088 A1 2/2005 Nguyen et al.
2005/0043092 A1 2/2005 Gauselmann
2005/0043094 A1 2/2005 Nguyen et al.
2005/0049028 A1 3/2005 Gornez et al.
2005/0054438 A1 3/2005 Rothschild et al.
2005/0056995 A1 3/2005 Tempest et al.
2005/0059467 A1 3/2005 Saffari et al.
2005/0064926 A1 3/2005 Walker et al.
2005/0075164 A1 4/2005 Krynicky
2005/0070356 A1 5/2005 Mothwurf et al.
2005/0096121 A1 5/2005 Gilliland et al.
2005/0096124 A1 5/2005 Stronach
2005/0101375 A1 5/2005 Webb et al.
2005/0101379 A1 5/2005 Falconer
2005/0119052 A1 6/2005 Russell et al.
2005/0124411 A1 6/2005 Schneider et al.
2005/0124415 A1 6/2005 Centuori et al.
2005/0148377 A1 7/2005 Goldberg et al.
2005/0148380 A1 7/2005 Cannon et al.
2005/0148383 A1 7/2005 Mayeroff
2005/0153773 A1 7/2005 Nguyen et al.
2005/0164764 A1 7/2005 Ghaly
2005/0181856 A1 8/2005 Cannon et al.
2005/0181860 A1 8/2005 Nguyen et al.
2005/0181862 A1 8/2005 Ashter et al.
2005/0187014 A1 8/2005 Saffari et al.
2005/0208995 A1 9/2005 Marshall et al.
2005/0215311 A1 9/2005 Hornik et al.
2005/0215314 A1* 9/2005 Schneider ........... G07F 17/3244 463/26
2005/0215316 A1 9/2005 Rowe et al.
2005/0233794 A1 10/2005 Cannon et al.
2005/0239541 A1 10/2005 Jorasch et al.
2005/0239545 A1 10/2005 Rowe
2005/0251440 A1 11/2005 Bednarek
2005/0255902 A1 11/2005 Lind
2005/0266905 A1 12/2005 Emori et al.
2006/0009284 A1 1/2006 Shwartz et al.
2006/0025205 A1 2/2006 Casey et al.
2006/0025207 A1 2/2006 Walker et al.
2006/0025210 A1 2/2006 Johnson
2006/0030391 A1 2/2006 Casey et al.
2006/0030400 A1 2/2006 Mathis
2006/0030403 A1 2/2006 Lafky et al.
2006/0040723 A1 2/2006 Baerlocher et al.
2006/0040730 A1 2/2006 Walker et al.
2006/0046816 A1 3/2006 Walker
2006/0046830 A1 3/2006 Webb
2006/0046835 A1 3/2006 Walker et al.
2006/0052160 A1 3/2006 Saffari et al.
2006/0058095 A1 3/2006 Berman et al.
2006/0058097 A1 3/2006 Berman et al.
2006/0063578 A1 3/2006 Bansemer et al.
2006/0063588 A1* 3/2006 Poole .................. G07F 17/3244 463/20
2006/0068898 A1 3/2006 Maya
2006/0068899 A1 3/2006 White et al.
2006/0068903 A1 3/2006 Walker et al.
2006/0073872 A1 4/2006 B-Jensen
2006/0073884 A1 4/2006 Walker et al.
2006/0073887 A1 4/2006 Nguyen et al.
2006/0079310 A1 4/2006 Friedman et al.
2006/0079314 A1 4/2006 Walker et al.
2006/0084496 A1 4/2006 Jaffe et al.
2006/0094493 A1 5/2006 Kido
2006/0100009 A1 5/2006 Walker et al.
2006/0105836 A1 5/2006 Walker et al.
2006/0116201 A1 6/2006 Gauselmann
2006/0121972 A1 6/2006 Walker et al.
2006/0128467 A1 6/2006 Thomas
2006/0135249 A1 6/2006 Seelig et al.
2006/0148559 A1 7/2006 Jordan et al.
2006/0149632 A1 7/2006 Register et al.
2006/0154714 A1 7/2006 Montross et al.
2006/0174270 A1 8/2006 Westberg et al.
2006/0183530 A1 8/2006 Ellis
2006/0183536 A1 8/2006 Gagner et al.
2006/0189363 A1 8/2006 Strom
2006/0199631 A1 9/2006 Mcgill et al.
2006/0211486 A1 9/2006 Walker et al.
2006/0217175 A1 9/2006 Walker et al.
2006/0229127 A1 10/2006 Walker et al.
2006/0234791 A1 10/2006 Nguyen et al.
2006/0247034 A1 11/2006 Schneider et al.
2006/0247041 A1 11/2006 Walker et al.
2006/0252510 A1 11/2006 Walker et al.
2006/0252512 A1 11/2006 Walker et al.
2006/0258422 A1 11/2006 Walker et al.
2006/0258425 A1 11/2006 Edidin et al.
2006/0258432 A1 11/2006 Packer et al.
2006/0287034 A1 12/2006 Englman et al.
2006/0287045 A1 12/2006 Walker et al.
2006/0287098 A1 12/2006 Morrow et al.
2006/0287102 A1 12/2006 White et al.
2007/0001396 A1 1/2007 Walker et al.
2007/0010309 A1 1/2007 Giobbi et al.
2007/0010315 A1 1/2007 Hein
2007/0050256 A1 3/2007 Walker et al.
2007/0054733 A1 3/2007 Baerlocher
2007/0060252 A1 3/2007 Taylor
2007/0060274 A1 3/2007 Rowe et al.
2007/0060323 A1 3/2007 Isaac et al.
2007/0060387 A1 3/2007 Enzminger et al.
2007/0082727 A1 4/2007 Ebisawa et al.
2007/0087806 A1 4/2007 Luciano et al.
2007/0087818 A1 4/2007 Walker et al.
2007/0105615 A1 5/2007 Lind
2007/0105618 A1 5/2007 Steil
2007/0106553 A1 5/2007 Jordan et al.
2007/0111776 A1 5/2007 Griswold et al.
2007/0117619 A1 5/2007 Walker et al.
2007/0117623 A1 5/2007 Nelson et al.
2007/0129147 A1 6/2007 Gagner
2007/0135214 A1 6/2007 Walker et al.
2007/0143156 A1 6/2007 van Deursen
2007/0167210 A1 7/2007 Kelly et al.
2007/0191087 A1 8/2007 Thomas et al.
2007/0191089 A1 8/2007 Yoshizawa
2007/0197247 A1 8/2007 Inselberg
2007/0205556 A1 9/2007 Roemer et al.

(56) References Cited

U.S. PATENT DOCUMENTS

2007/0259709 A1 11/2007 Kelly et al.
2007/0275777 A1 11/2007 Walker et al.
2008/0015004 A1 1/2008 Gatto et al.
2008/0020845 A1 1/2008 Low et al.
2008/0026840 A1* 1/2008 Souza .................... G07F 17/32 463/31
2008/0039190 A1 2/2008 Walker et al.
2008/0045317 A1 2/2008 Seelig et al.
2008/0058105 A1 3/2008 Combs et al.
2008/0064495 A1 3/2008 Bryant et al.
2008/0076576 A1 3/2008 Graham et al.
2008/0090651 A1 4/2008 Baerlocher
2008/0096636 A1 4/2008 Power
2008/0102921 A1 5/2008 Urquhart
2008/0102935 A1 5/2008 Finnimore
2008/0102946 A1 5/2008 Amour
2008/0108423 A1 5/2008 Benbrahim et al.
2008/0108433 A1 5/2008 DiMichele et al.
2008/0113749 A1 5/2008 Williams et al.
2008/0113779 A1 5/2008 Cregan
2008/0113811 A1 5/2008 Linard et al.
2008/0119283 A1 5/2008 Baerlocher
2008/0132320 A1 6/2008 Rodgers
2008/0146331 A1 6/2008 Nordman et al.
2008/0153564 A1 6/2008 Baerlocher et al.
2008/0153596 A1 6/2008 Nguyen
2008/0171586 A1 7/2008 Roemer
2008/0176647 A1 7/2008 Acres
2008/0182655 A1 7/2008 DeWaal et al.
2008/0207313 A1 8/2008 Acres
2008/0220861 A1 9/2008 Okada
2008/0227551 A1 9/2008 Kelly et al.
2008/0234035 A1 9/2008 Malek
2008/0242394 A1 10/2008 Sakuma
2008/0242398 A1 10/2008 Harris et al.
2008/0248851 A1 10/2008 Bloom
2008/0254886 A1 10/2008 Kelly
2008/0261699 A1 10/2008 Topham et al.
2008/0268959 A1 10/2008 Bryson et al.
2008/0280674 A1 11/2008 Sakuma
2008/0287186 A1 11/2008 Sakuma
2008/0293467 A1 11/2008 Mathis
2008/0318656 A1 12/2008 Walker et al.
2009/0005170 A9 1/2009 Kelly et al.
2009/0036202 A1 2/2009 Baerlocher et al.
2009/0048010 A1* 2/2009 Kroeckel ............ G07F 17/3248 463/16
2009/0069068 A1 3/2009 Cole et al.
2009/0070081 A1 3/2009 Saenz et al.
2009/0075728 A1 3/2009 Acres
2009/0088239 A1 4/2009 Iddings et al.
2009/0093289 A1 4/2009 Toyoda
2009/0117981 A1 5/2009 Yoshizawa
2009/0124327 A1 5/2009 Caputo et al.
2009/0124364 A1 5/2009 Cuddy et al.
2009/0131175 A1 5/2009 Kelly et al.
2009/0170608 A1 7/2009 Herrmann et al.
2009/0176580 A1 7/2009 Herrmann et al.
2009/0233682 A1 9/2009 Kato et al.
2009/0239601 A1 9/2009 Macke
2009/0239622 A1 9/2009 Fujimori et al.
2009/0239628 A1 9/2009 Fujimori et al.
2009/0239638 A1 9/2009 Abe
2009/0239648 A1 9/2009 Acres
2009/0239660 A1 9/2009 Acres
2009/0239661 A1 9/2009 Acres
2009/0247284 A1 10/2009 Sugiyama et al.
2009/0253477 A1 10/2009 Teranishi
2009/0253478 A1 10/2009 Walker et al.
2009/0253490 A1 10/2009 Teranishi
2009/0270168 A1 10/2009 Englman et al.
2009/0286590 A1 11/2009 Bennett
2009/0325669 A1 12/2009 Kelly et al.
2009/0325670 A1 12/2009 Kelly et al.
2010/0016055 A1 1/2010 Englman et al.
2010/0041464 A1 2/2010 Arezina et al.
2010/0048286 A1 2/2010 Okada et al.
2010/0056248 A1 3/2010 Acres
2010/0056259 A1* 3/2010 Okada .................... G07F 17/32 463/25
2010/0075741 A1 3/2010 Aoki et al.
2010/0105454 A1 4/2010 Weber et al.
2010/0105466 A1 4/2010 Inamure et al.
2010/0113130 A1 5/2010 Kamano et al.
2010/0120492 A1 5/2010 Davis et al.
2010/0124960 A1 5/2010 Lutnick et al.
2010/0124967 A1 5/2010 Utnick et al.
2010/0124981 A1 5/2010 Kato et al.
2010/0210336 A1 8/2010 Berman et al.
2010/0210338 A1 8/2010 Taylor
2010/0285867 A1 11/2010 Okada
2010/0304834 A1 12/2010 Okada
2011/0034237 A1 2/2011 Schulhof et al.
2011/0039615 A1 2/2011 Acres
2011/0081958 A1 4/2011 Herrmann et al.
2011/0081964 A1 4/2011 Acres
2011/0159950 A1 6/2011 Okada
2011/0165938 A1 7/2011 Anderson et al.
2011/0218030 A1 9/2011 Acres
2011/0275438 A9 11/2011 Hardy et al.
2011/0281632 A1 11/2011 Okada
2011/0287826 A1 11/2011 Kato et al.
2011/0294563 A1 12/2011 Jaffe
2012/0077565 A1 3/2012 Barbalet
2012/0115566 A1 5/2012 Fujisawa et al.
2012/0190425 A1 7/2012 Barbalet
2017/0039816 A1 2/2017 Acres
2017/0178845 A1 6/2017 Acres
2017/0228977 A1 8/2017 Acres
2017/0301175 A1 10/2017 Acres
2017/0301180 A1 10/2017 Acres
2018/0082537 A1 3/2018 Acres
2018/0253930 A1 9/2018 Acres
2018/0342133 A1 11/2018 Acres
2019/0304240 A1 10/2019 Acres
2020/0134972 A1 4/2020 Acres
2020/0380818 A1 12/2020 Acres
2021/0134119 A1 5/2021 Acres
2021/0201620 A1 7/2021 Acres

FOREIGN PATENT DOCUMENTS

EP 0141264 A2 5/1985
EP 0896308 A1 2/1992
EP 0896304 A2 2/1998
EP 0919965 A2 6/1999
EP 0981397 A1 3/2000
EP 1091789 A1 4/2001
EP 1231577 A2 8/2002
EP 1351180 A2 10/2003
EP 1369830 A1 12/2003
EP 1490849 A2 12/2004
EP 1496419 A1 1/2005
EP 1623375 A1 2/2006
EP 1637196 A1 3/2006
EP 1832952 A2 9/2007
IN 1842826 A 10/2006
JP 0221883 9/1990
WO 9521665 8/1995
WO 9531262 11/1995
WO 9635490 11/1995
WO 9746293 12/1997
WO 0017825 3/2000
WO 0032286 6/2000
WO 0064545 11/2000
WO 0136059 A1 5/2001
WO 0159680 A1 8/2001
WO 0180961 A1 11/2001
WO 03066179 A2 8/2003
WO 03089092 A1 10/2003
WO 2004/046859 6/2004
WO 2005008514 1/2005
WO 2005029279 A2 3/2005
WO 2005029287 A2 3/2005

(56) References Cited

FOREIGN PATENT DOCUMENTS

| | | | |
|---|---|---|---|
| WO | 2005099845 | A1 | 10/2005 |
| WO | 2005113093 | A1 | 12/2005 |
| WO | 2006014745 | A2 | 2/2006 |
| WO | 2006014770 | A2 | 2/2006 |
| WO | 2006014990 | A2 | 2/2006 |
| WO | 2006023401 | A1 | 3/2006 |
| WO | 2006032498 | A1 | 3/2006 |
| WO | 2006036948 | A2 | 4/2006 |
| WO | 2006055518 | A2 | 5/2006 |
| WO | 2006060442 | A2 | 6/2006 |
| WO | 2006060493 | A2 | 6/2006 |
| WO | 2007087286 | A2 | 8/2007 |
| WO | 2008024705 | A2 | 2/2008 |

OTHER PUBLICATIONS

"White Paper: An Analysis of Harrah's Total Rewards Players Rewards Program" written and published by Gaming Market Advisor on or before Dec. 31, 2006, retrieved from URL <http://gamingmarketadvisors.com/publications/Harrah%20Total%20Rewards%20White%20Paper.pdf>, 41 pages.

Acres, John, Measuring the Player Experience: What a Squiggly Line Can Tell You, Inside Edge/ Slot Manager, Jan./ Feb. 2009, pp. 28-29.

Acres, John, An Ingenious Internet Marketing Tool, Slot Operations Management/ Casino Enterprise Management, Aug. 2007, pp. 8-10.

Acres, John, The Future of Gaming, Where Will You be in 10 Years?, Slot Operations Management/ Casino Enterprise Management, Jul. 2007, pp. 8-10, 12.

Macao Exam Report, Jul. 28, 2016, 9 pages (Chinese only).

* cited by examiner

METHOD FOR OPERATING A GAMING DEVICE THAT DISPLAYS SYMBOLS

RELATED APPLICATIONS

This application is a continuation of U.S. patent application Ser. No. 16/041,886, filed Jul. 23, 2018, now U.S. Pat. No. 11,176,783, issued on Nov. 16, 2021, which is a continuation of U.S. patent application Ser. No. 15/297,743, filed Oct. 19, 2016, now U.S. Pat. No. 10,032,341 issued Jul. 24, 2018, which is a continuation of U.S. application Ser. No. 14/099,445, filed Dec. 6, 2013, now U.S. Pat. No. 9,501,907, issued on Nov. 22, 2016, which is a continuation application of U.S. application Ser. No. 12/406,458, filed Mar. 18, 2009, now U.S. Pat. No. 8,602,866, issued on Dec. 10, 2013, which claims the benefit of U.S. Provisional Application No. 61/038,548, filed Mar. 21, 2008, and U.S. Provisional Application No. 61/156,767, filed Mar. 2, 2009, the contents of the foregoing applications are hereby incorporated by reference.

FIELD OF THE INVENTION

This disclosure relates generally to electronic gaming devices and more particularly to a method and system for providing a player of such devices with an award that is not mandated by a pay table in the gaming device.

BACKGROUND

It is known to provide players of electronic gaming devices, such as video or mechanical slot machines or video poker machines, with awards, sometimes referred to as bonuses, which are above and beyond any award that is required by the pay table in the electronic gaming device. Some of these awards are provided via a network that connects a plurality of such gaming devices. For example, if there is a short period where all or some of the games are promoted as awarding double jackpots, the network can look for a jackpot on one of the devices and send a command to that device causing it to pay an amount equal to the jackpot thereby doubling the jackpot. Other awards are mystery or random awards that are provided to a player independently of any outcome on the gaming device being played.

The present invention provides a method and system for generating such an award or bonus that is more closely aligned with the game being played on the gaming device.

DETAILED DESCRIPTION

Figure 1A:
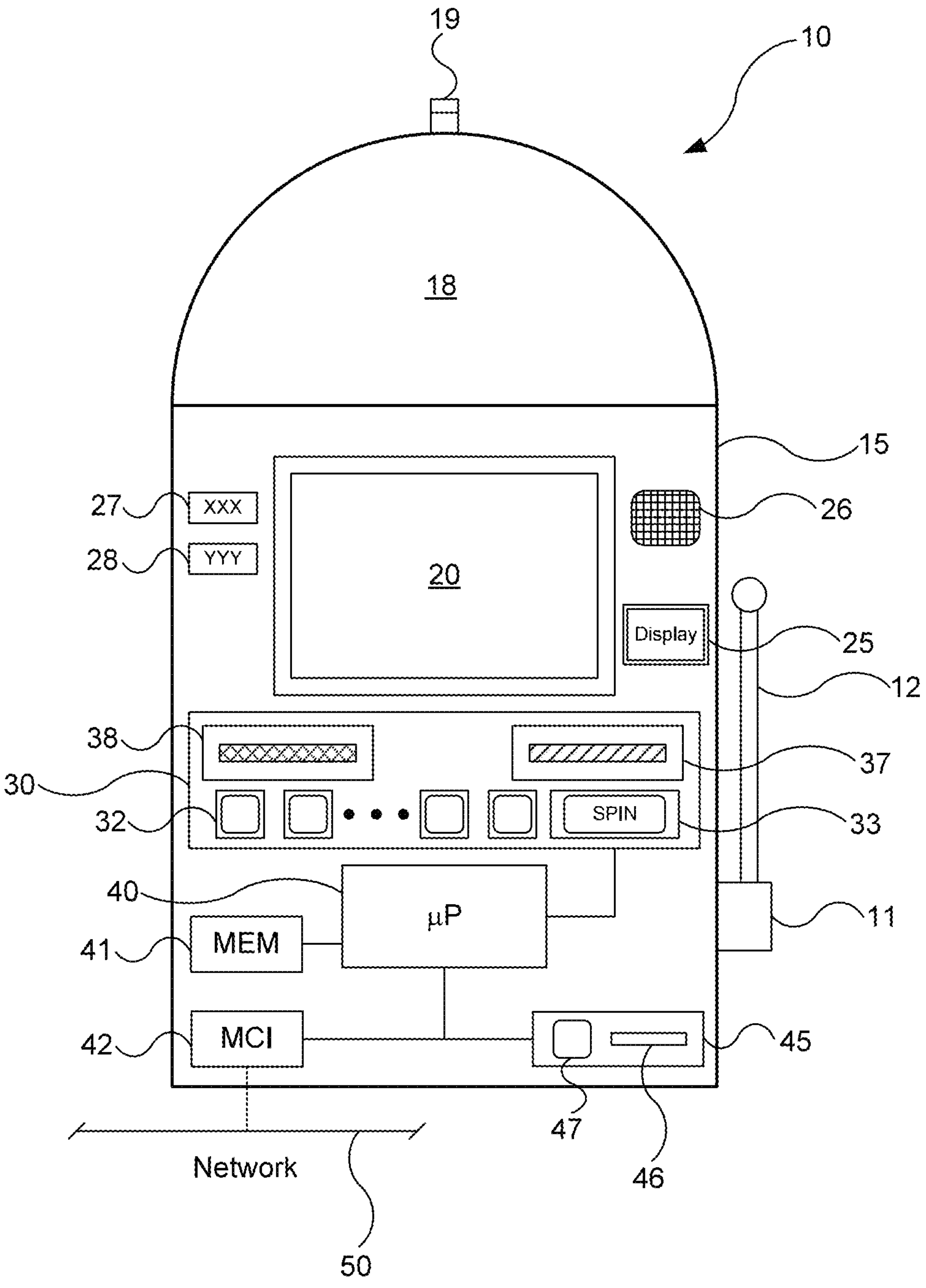
FIG. 1A is a functional block diagram that illustrates a gaming device according to embodiments of the invention.
Figure 1B:
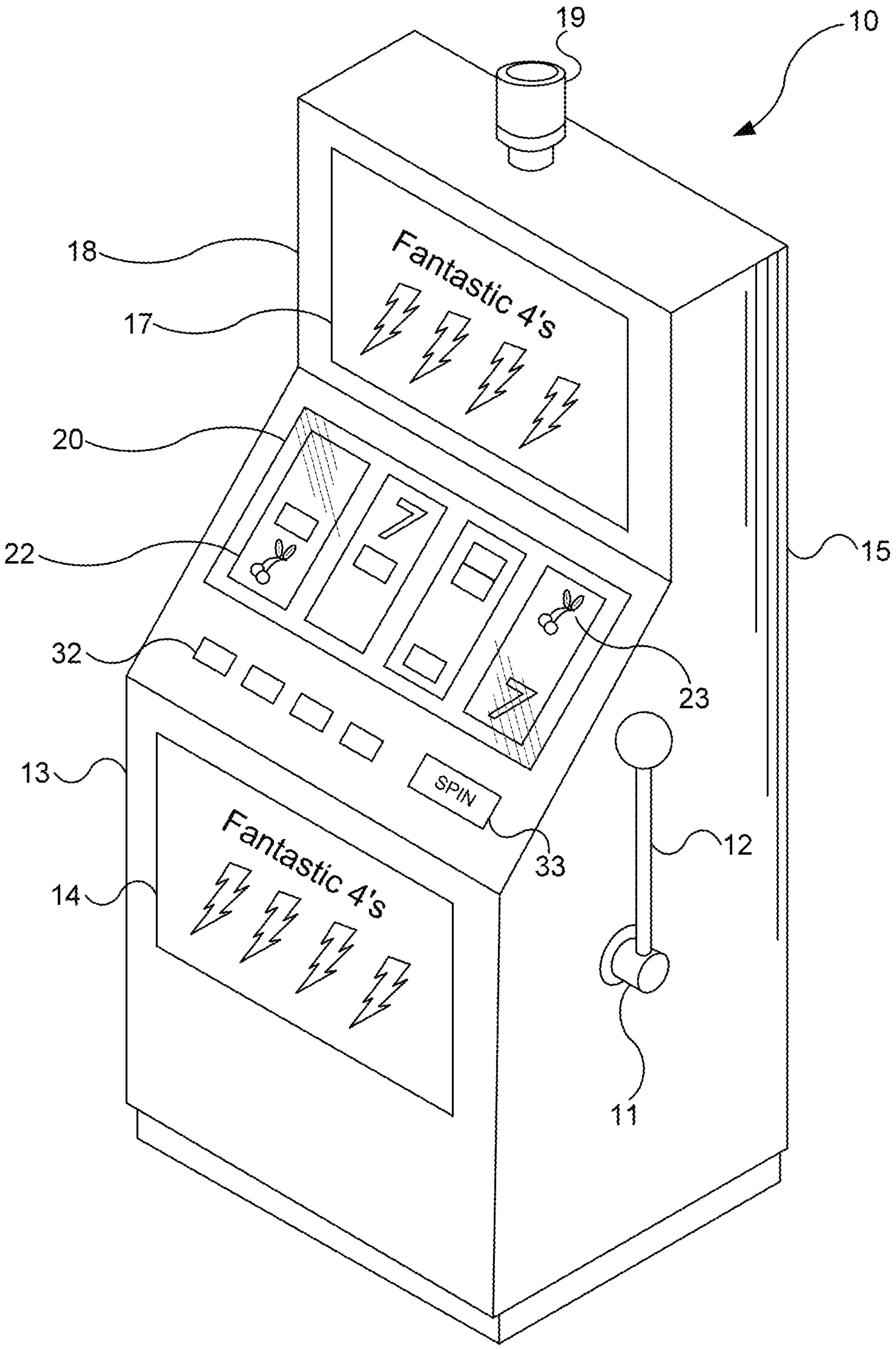
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window." Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). One of skill in the art will readily see that this invention is useful with all gambling devices, regardless of the manner in which wager value-input is accomplished.

The credit meter 27 displays the numeric credit value of the money inserted dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
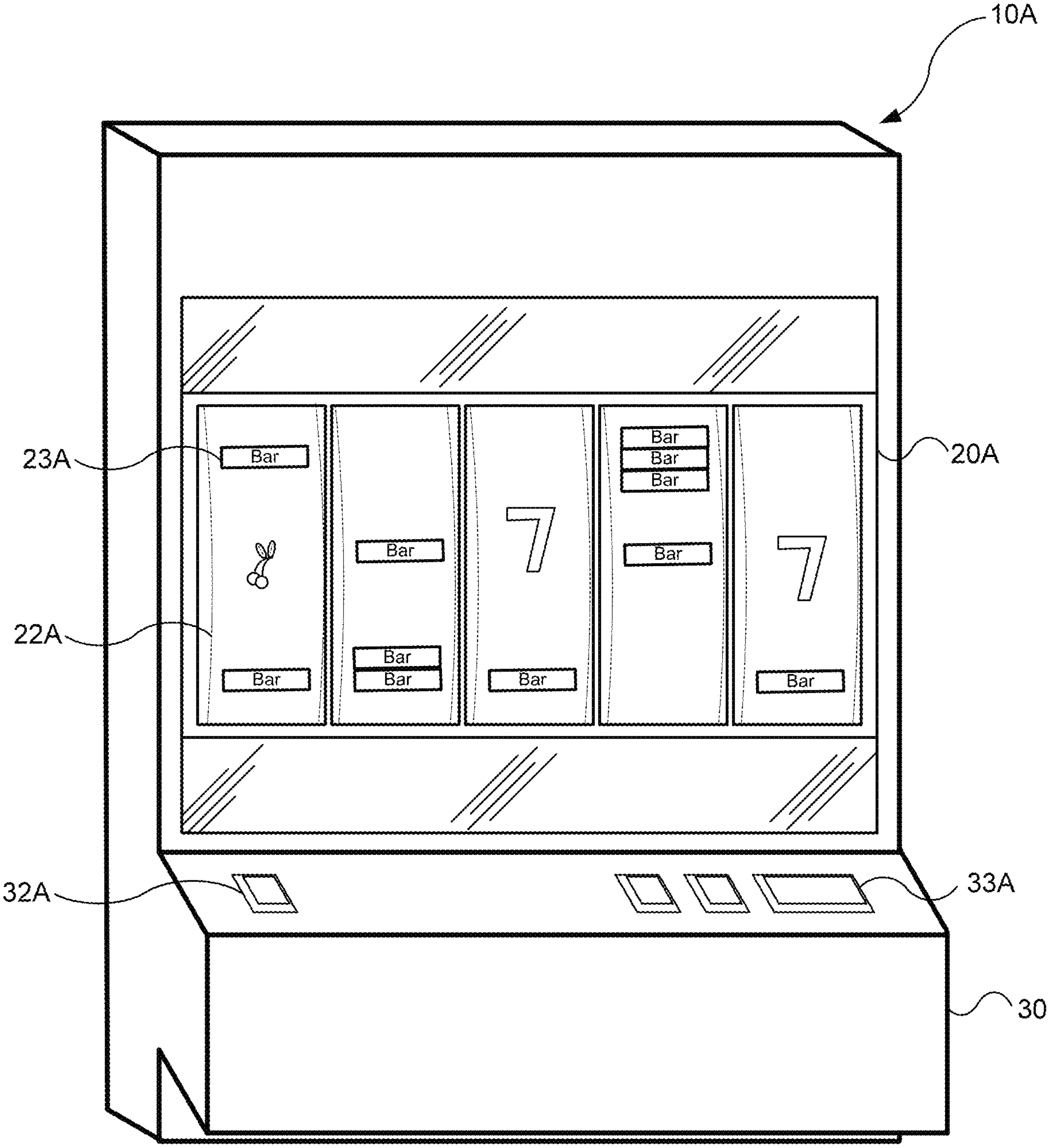
FIGS. 2A, 2B, and 2C are detail diagrams of exemplary types of gaming devices according to embodiments of the invention.
Figure 2B:
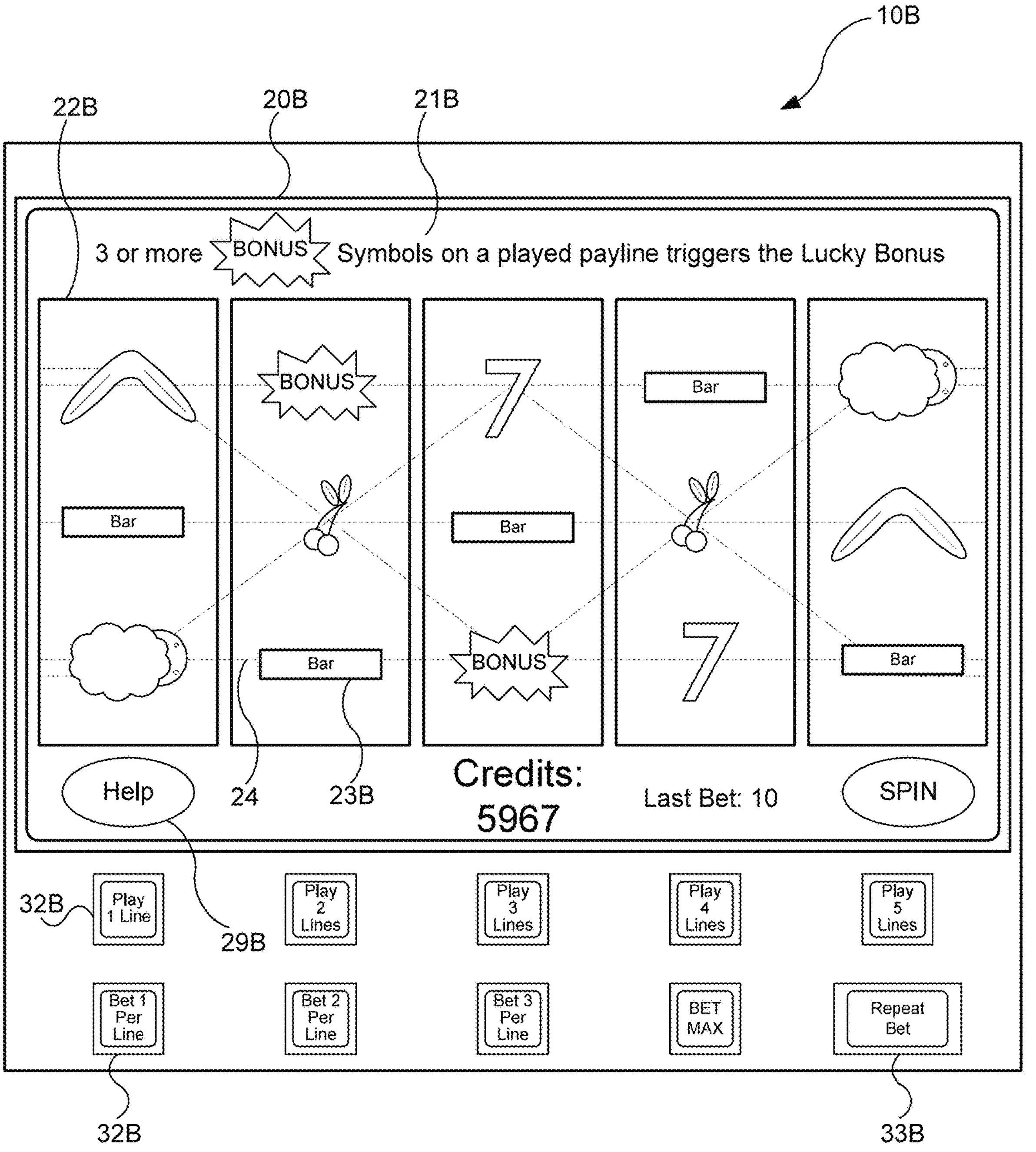
Figure 2C:
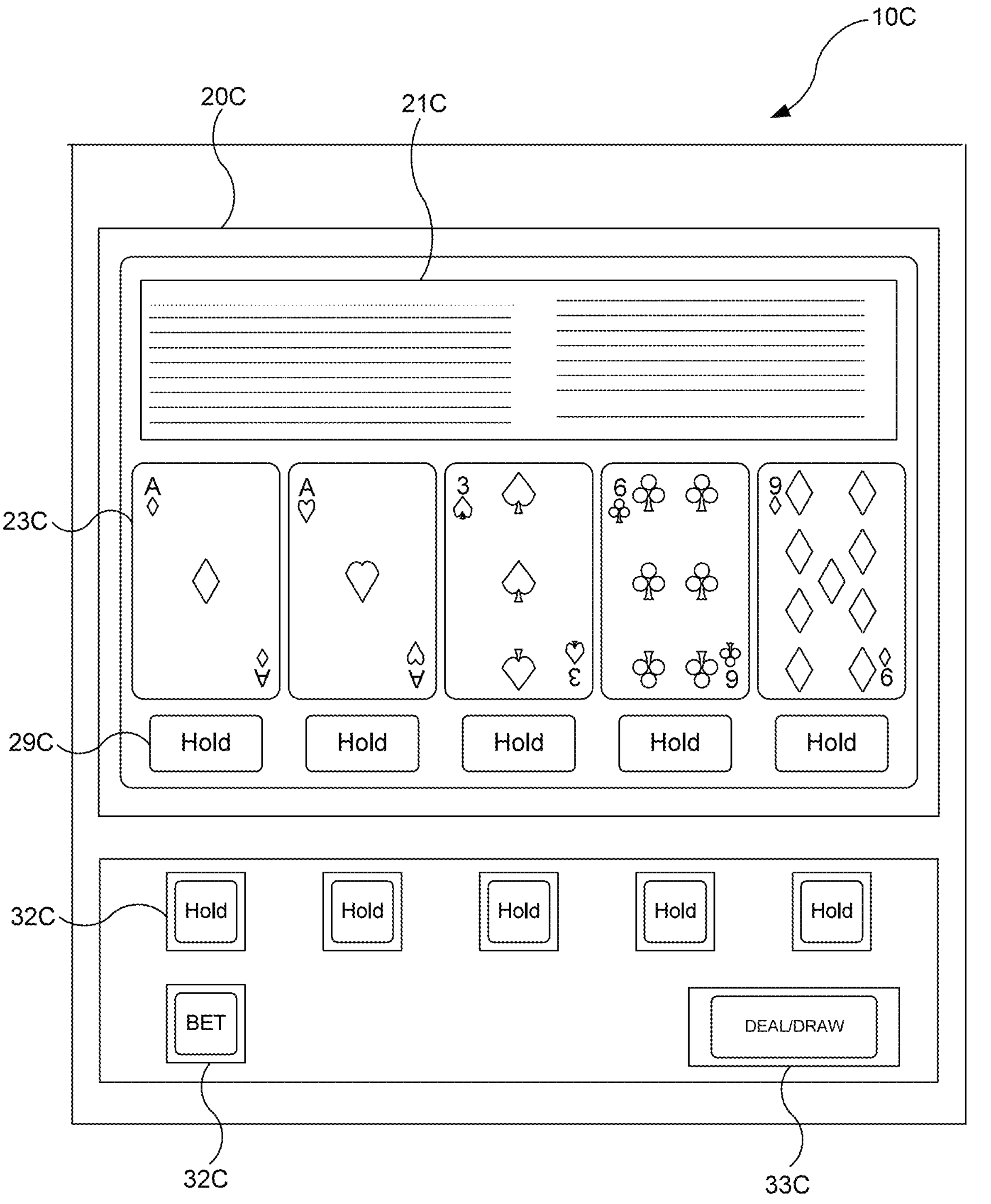

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touchscreen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
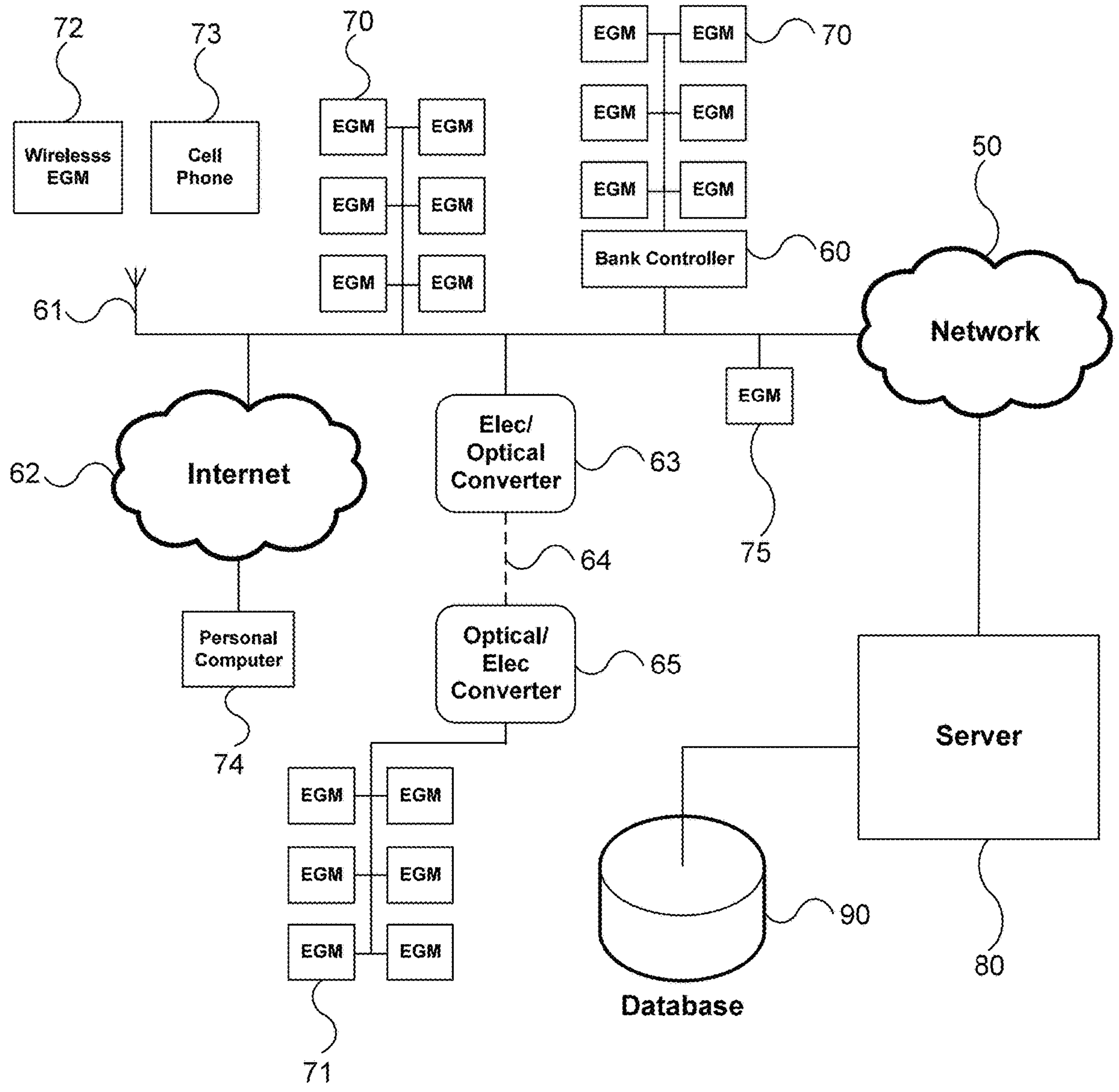
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino.

The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4:
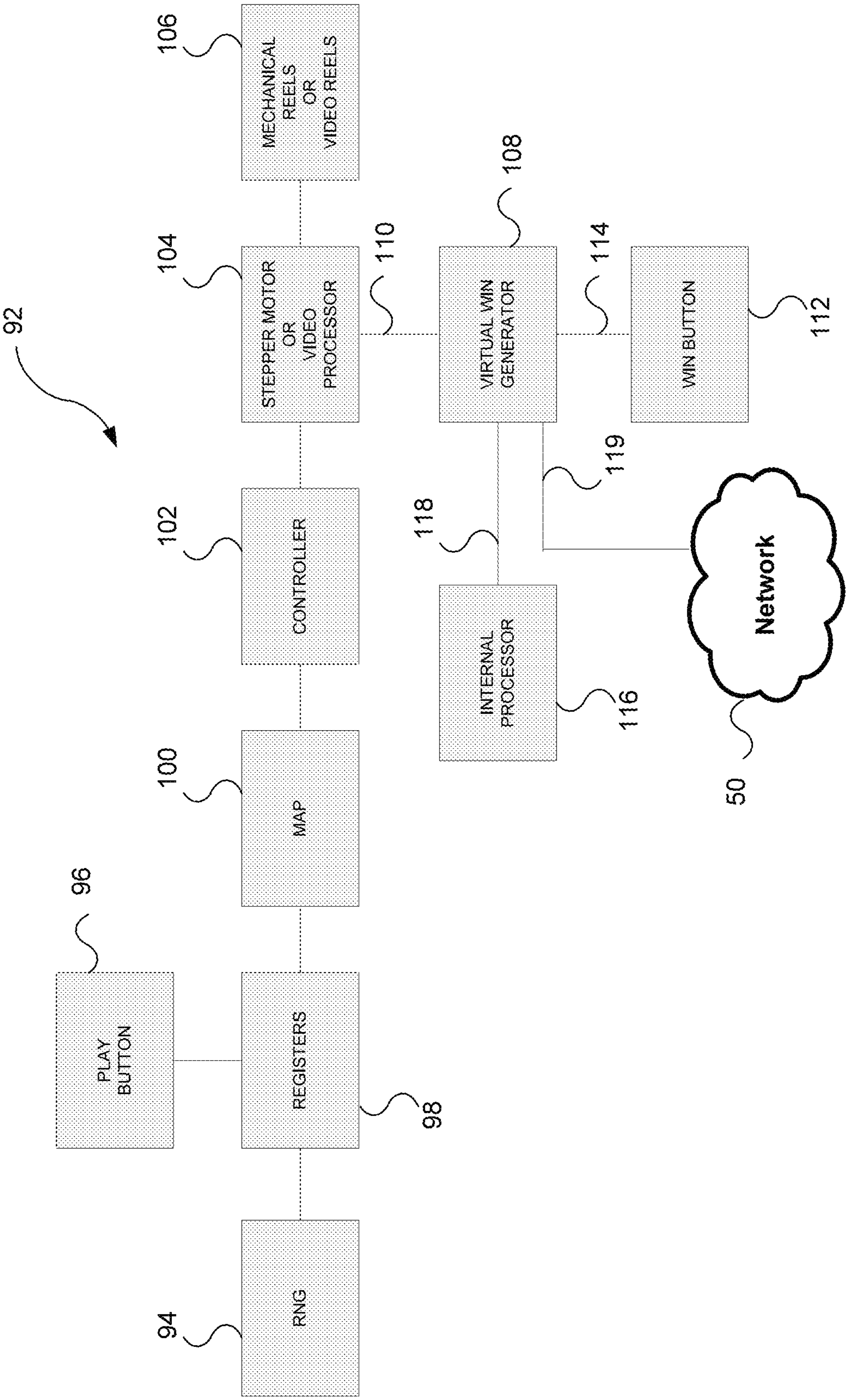
FIG. 4 is a schematic diagram of a gaming device that implements the present invention.

Indicated generally at 92 in FIG. 4 is a schematic diagram of an electronic gaming device constructed in accordance with the present invention. The gaming device includes a random number generator (RNG) 94, which—as is known in the art—continuously generates random numbers. A play button 96 is mounted on the exterior of the gaming device and is used by a player to initiate play of a game. When the player hits play button 96, at least one random number is selected from the output of RNG 94 and stored in buffers or registers 98. Some electronic gaming devices, such as video or mechanical slot machines, require a different random number for each outcome, such as a reel position, generated by the gaming device.

In any event, after the random number or numbers are stored in registers 98 they are mapped in a table or map 100 that maps each random number into a particular outcome, such as a reel position. As is known in the art, there may be a very large range of potential random numbers, e.g., in the thousands, which are mapped onto a relatively small range of potential outcomes, e.g., 12 reel positions. Having many different ones of the random numbers within the range mapped onto a single outcome facilitates precisely setting the odds for generating a particular outcome.

Once the outcomes are determined by map 100, they are provided to a controller 102. The controller in turn provides drive signals to an output mechanism 104, e.g., a stepper motor in the case of a mechanical slot machine, or a video processor, in the case of a video slot, poker, or other video game. When gaming device 92 is a mechanical slot machine, stepper motor output mechanism 104 drives a display 106, in this case mechanical reels, to the outcome determined by map 100. Likewise, when gaming device 92 is a video slot machine, video processor output mechanism 104 generates a video image on display 106, which in the case of a video game is a video screen. Such a display typically shows rotating reels that stop at the outcome(s) determined by map 100. Display 106 informs the player of the outcome of the game just played, typically after some initial activity such as spinning video or mechanical reels. It should be appreciated that the present invention may be implemented in a wide variety of gaming devices, such as video games, like slot machines, poker, keno, etc., and other games such as a mechanical slot machine, a roulette game or a mechanical bonus wheel.

A virtual win generator 108, which may be implemented as a software process or as a circuit, includes an output line 110 that is connected to an input of output mechanism 104. Virtual win generator, like controller 102, may also be used to drive output mechanism 104 to generate an outcome that may be predefined.

As will be seen in more detail, however, virtual win generator 108 does not drive output mechanism 104 to produce an outcome determined by RNG 94 and map 100. Also, rather than providing a separate virtual win generator 108, a second input line could be provided to controller 102 to cause it to signal output mechanism 104 to produce an outcome other than one determined by the RNG and map.

An optional win button 112 includes an output line 114 that is connected to an input of virtual win generator 108. Like play button 96, win button 112 is mounted on the exterior of the gaming device and is used by a player of the game in a manner that will be shortly described.

Finally, an internal processor 116 has an output line 118 that is connected to an input of virtual win generator 108. The internal processor, which is also optional, may be used to control virtual win generator 108, either in whole or in part, to produce outcomes on display 106. As will be seen, there are innumerable conditions and rules that may be implemented by processor 116, some of which will be described shortly, to cause virtual win generator 108 to produce an outcome, which is shown on display 106. Another input line 119 to virtual win generator 108 receives signals via network 50. The network signals are generated by a process operated by a computing device connected to the network. As will be seen, some of the rules and conditions implemented by processor 116 may involve data collected by the player tracking system on network 50. It should be appreciated, however, the invention could be implemented solely by use of an internal processor 116, in which case line 119 might not even be present, or solely by commands generated on network 50 and delivered to virtual win generator 108 on line 119, in which case internal processor 116 might not even be present. In addition, the invention may be implemented using both processor 116 and network commands delivered on line 119.

As described above, the typical electronic gaming device generates random outcomes. As is known in the art, the payback percentage—the percentage of wagers that are paid to players as awards—and the volatility of an electronic gaming device may be selected by the casino. The volatility is an indication of whether the gaming device will produce on average larger wins that are few and far between losses or whether the player will experience more frequent but smaller wins. Both payback percentage and volatility are theoretical numbers. The actual payback percentage and volatility are tracked over time to confirm they remain close to the designed values. If they do not, it may be an indication that a machine is malfunctioning or that it has been tampered with.

Since both these parameters are theoretical and will converge over time if everything is as it should be, a player may encounter a period of time or a gaming session in which the volatility and/or the payback percentage is at a substantial random variance from their designed values. Of course, if the player is winning more frequently and/or with larger awards than the volatility or payback percentage would predict over the long haul, the player is delighted. The flip side of that experience is a period of gaming in which the machine is paying less—possibly much less—either in frequency or amount of awards. This experience leaves most players dispirited and not inclined to play that game and perhaps any other at a casino where the game is located.

It is known that new players to a casino may be heavily influenced by their early experience there. If that experience is primarily a losing experience, the player is much less likely to become a regular there, or even return, than if the earliest experiences are winning ones. Of course different players appreciate different kinds of experiences. For example some players like to have a high volatility experience, i.e., larger but less frequent awards. Others, on the other hand, prefer a relatively steady stream of lower paying awards. In addition, the casino might wish to provide a richer experience for players that represent high value to the casino, i.e., those who wager higher amounts or who wager lower amounts but are regulars or those who are likely to fall into either category. In short, the casino needs to know information about a player before it can provide a gaming experience that the player appreciates and that makes economic sense to the casino.

Figure 5:
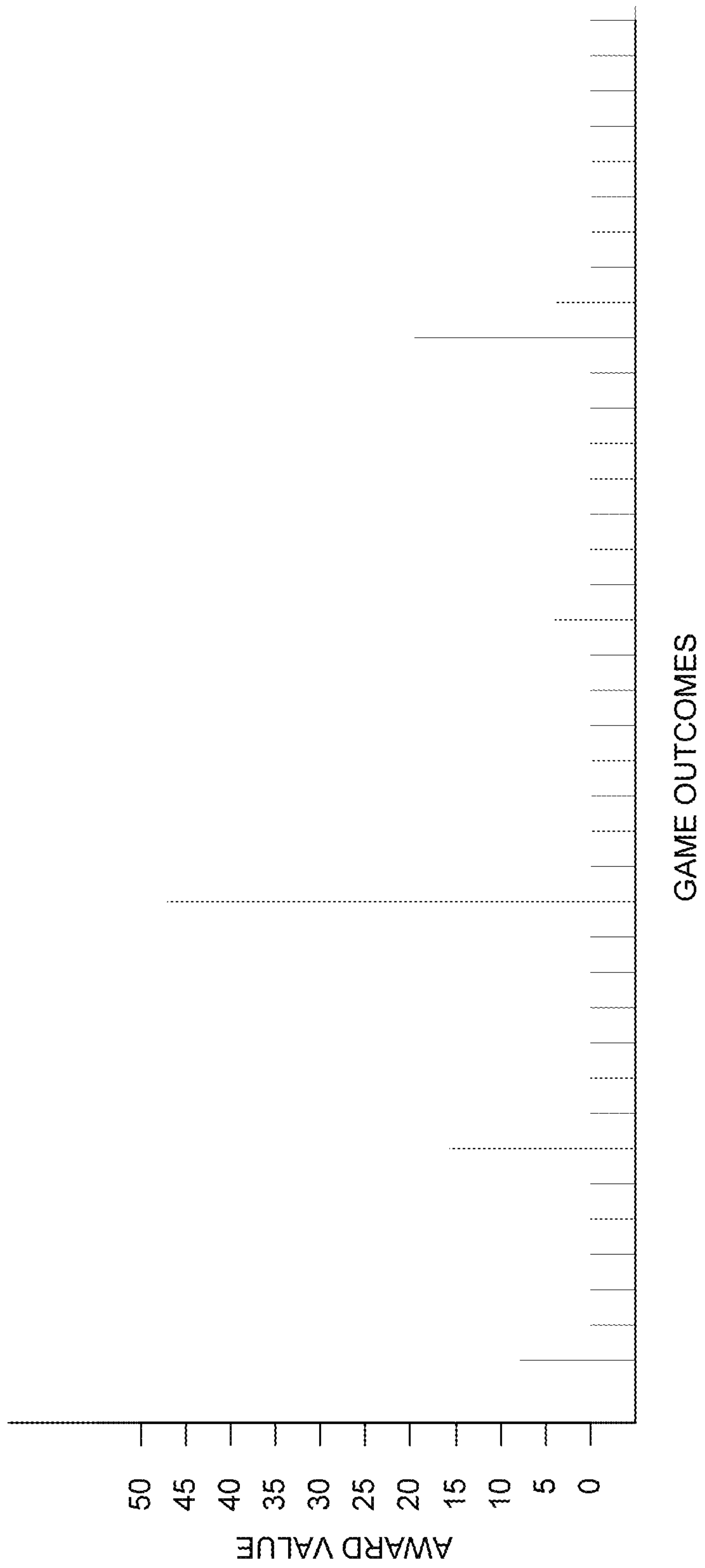
FIG. 5 is a chart depicting game outcomes and awards on a gaming device.
Figure 6:
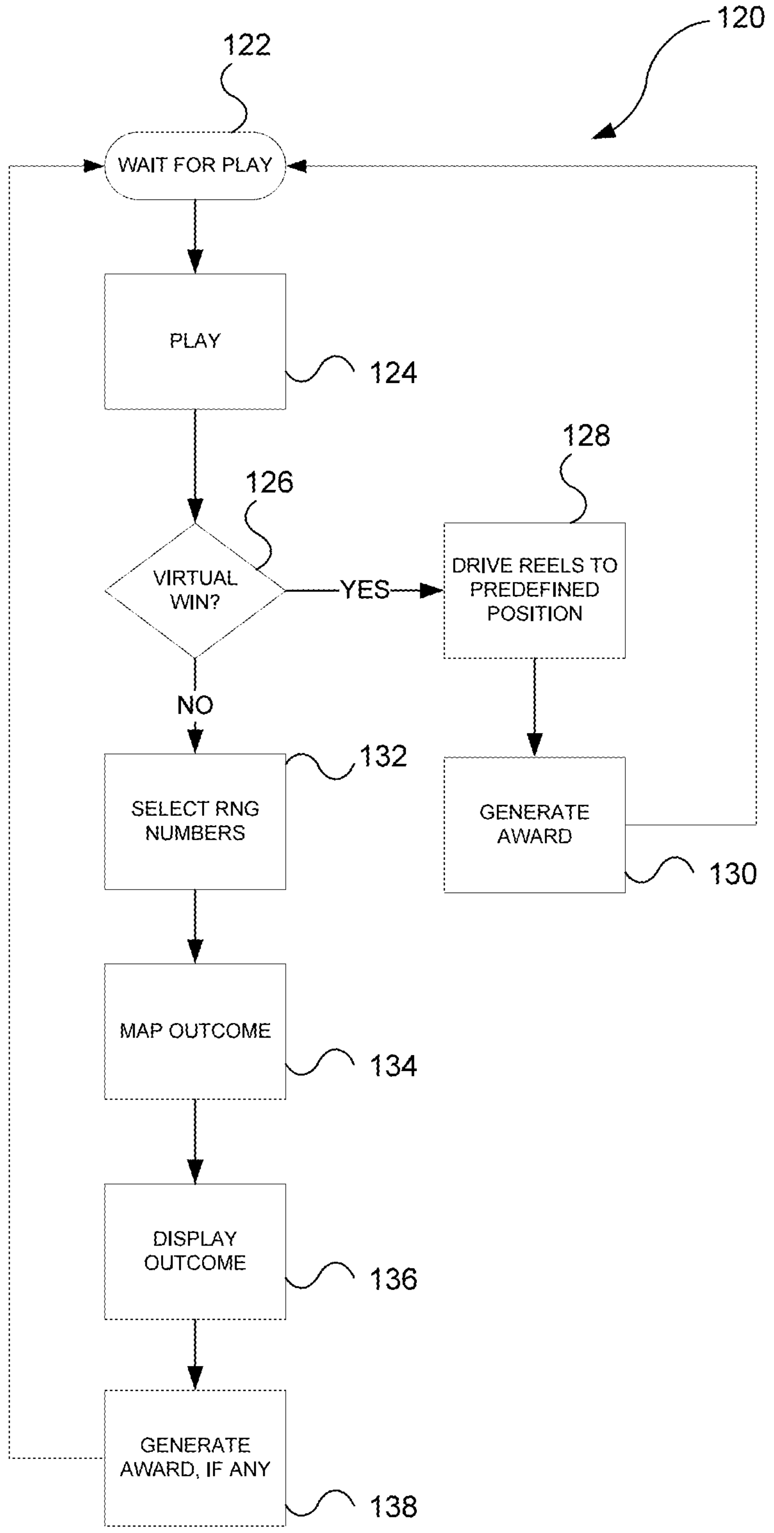
FIG. 6 is a first process for implementing the present invention.

A player's volatility preference may be observed by tracking the player's play and drawing inferences from how the player responds to certain situations. As can be seen in FIG. 5, play is tracked by observing the outcomes of each game played. Each vertical line represents a game played and the amount of any award the resulted from the game play. It should be noted that this data may be collected by the player tracking system for an enrolled player who uses his or her card. But it may also be collected anonymously by observing an uncarded player. This could be collected for a particular amount of credit wagered, e.g., if $20 is placed on the credit meter and wagered in successive games until the meter is at $0, it is reasonable to infer that this play is attributable to a single, albeit anonymous, player. There are a variety of ways to attribute play to a player, including those defined in U.S. application Ser. No. 12/061,516 for Method for Attributing Gameplay Credit to a Player, filed Apr. 2, 2008, which is incorporated herein by reference for all purposes. Of course, the play of a player who uses a player tracking card is accurately collected and stored in the player tracking system.

Regardless of how game play is attributed to the player, once the play is collected, inferences can be drawn concerning the player's volatility preference. For example, a player who consistently cashes out after about 5 successive losses indicates a player who probably needs to experience a winning event, even if the award is small, more frequently than a player who consistently continues play through 10 or more losses. In addition, some games allow a player to carry forward a winning amount to a further round of play where a larger award is possible—or where the previously won amount may be lost. A player who consistently cashes out without playing the next round probably has a preference for low volatility. Conversely, a player who always goes to the next round may be classified as a high volatility player. Another way is to observe the length of time a player spends on low volatility vs. high volatility games. A player who spends 10 minutes at a high volatility game and two hours at a low volatility game probably has a preference for low volatility on most games. Another way is to observe the behavior of a player on a game with a set volatility during a time of play when the player experiences a substantial, albeit random, variance from the set volatility. For example, a player on a low volatility game who experiences a random high volatility streak and then cashes out when play shifts back to the expected low volatility, might be classified as having a high volatility preference. Any manner in which the casino can determine volatility preference, including asking the player, or observing gaming behavior that indicates a volatility preference may be used to implement the present invention.

Player value to the casino may be determined in a variety of ways, including acquiring information from the player, observing the player's behavior, or acquiring information from third parties. Once known, the casino may make informed decisions about the value of a winning event for a particular player. U.S. patent application Ser. No. 12/166,150 for Player Value Determination System, filed Jul. 1, 2008, hereby incorporated herein for all purposes, includes various techniques for calculating or estimating player value, which can be used to implement the present invention by estimating a preferred value of a winning event.

Consideration will now be given to exemplary rules and conditions for providing a player with a win that results from driving a game to present a predefined winning event and generating an award as if the game produced it.

For example, one such rule formula is: If $X is wagered and total wins are less than $Y, then pay $Z. This rule could be implemented by processor 116 or on a network computing device that communicates with virtual win generator 108 via line 119. This rule could apply to a particular gaming session as determined by the player tracking system or by a total amount wagered, whether the player is enrolled in the player tracking system or not, or by a predefined length of gaming time. For tracked players, the gaming time might total many hours that could only be accumulated over multiple sessions, which usually take place on different gaming devices. It is possible to layer the rules by having a single rule such as the rule referred to above, apply to gaming sessions or player periods of different length with the values in the rule changing depending upon the length of the session or period. For example here are some rules based on the above rule formula:

If $20 is wagered and total wins are less than $5, then pay $3 could apply to a single gaming session, regardless of length.

If $300 is wagered and total wins are less than $50, then pay $40 could apply to a consecutive 6 hours of gaming even if accumulated in multiple separate sessions.

If $1500 is wagered and total wins are less than $400, then pay $200 could apply to a consecutive 60 hours of gaming even if accumulated in multiple separate sessions.

These rules may all be implemented and running simultaneously. And the dollar amounts can vary depending upon the value of the player to the casino and the preferred frequency of winning events. The casino can implement the values in tables that reflect the casino's preference for how to award players based on value and preferred frequency. Other conditions may apply as well. For example the dollar values might change according to the time of the week that play occurs. Casinos are typically more willing to provide inducements to play during weekdays than on weekend evenings when more players are usually present. In addition, some rules may require that a player be carded or the dollar value may be different for carded and uncarded players. Of course, some rules require the player be carded to implement the rule, such as tracking 60 consecutive hours of gaming. But others might not necessarily, such as a rule implemented for a single gaming session.

These rules may be implemented by processor 116, by a computing device on the network that provides signals to virtual win generator 108, or by a combination of the two. For example, the first rule above, which applies only to a single gaming session, could be implemented locally on processor 116. It could apply to both carded and uncarded players or to either one. The next two rules most likely would require a player to be enrolled in the player tracking system, especially the third rule, which tracks play over 60 hours of gaming. The player tracking system could communicate with either a process on the network that implements the rule or it could communicate directly with virtual win generator 108 via line 119. This is also true with rules that require a player to be enrolled or that change the dollar values in a rule for an enrolled versus and unenrolled player.

Another rule formula that could be similarly implemented is: If $X wagered and no single win is greater than or equal to $Y, pay $Z. Like the rule formula above, this rule formula can be implemented with a variety of rules that each change at least one of the dollar values. For example, the $X might apply to a single gaming session or to longer tracked periods. And each rule could be in effect concurrently. Also, like the above rule, these dollar values may be selected by a casino based on the preferred value of a winning event and the preferred frequency of winning events. Similarly, different conditions might apply where either the rule is not in effect or the dollar values change depending upon whether or not the player is enrolled and/or the time of day or week.

Still another rule formula could be implemented that simply says: If X consecutive games are played without a win, pay $Z. Like the above rules, this could be implemented in various rules where X and Z have different values for each rule, and all the rules are in effect concurrently. Also like the other rules, different conditions might apply where either the rule is not in effect or the dollar values change depending upon whether or not the player is enrolled and/or the time of day or week.

All of the foregoing rules may be implemented concurrently, individually, or in various combinations. As can be seen, a wide variety of rules and conditions beyond those disclosed herein may be developed and implemented in the same manner as those described above.

Consideration will now be given to FIGS. 6, 7, 8, and 9, each of which describes a different behavior for gaming device 92 regardless of which rule or combination of rules are implemented.

Indicated generally at 120 is a first process that could be used to implement any of the rules and/or conditions described above or other rules and/or conditions. Initially, gaming machine 92 waits for play at 122. At 124, a player actuates play button 96 on the gaming machine. At 126, the process checks to see whether a virtual win will be provided according to any one of the rules or and/or conditions described above. Put differently, a single rule—perhaps qualified by a condition such as time of day or whether the player is using a player tracking card—is implemented at 126. To illustrate using one of the rules mentioned above, the process at 126 could be to check a current gaming session to see if $20 is wagered and total wins are less than $5. If this condition is satisfied, the process proceeds to 128 where the reels drive to a predefined position, in this case a position that corresponds to a $3 win for the pay table of gaming device 92. The reels drive according to a signal generated by process 122 that is supplied to virtual win generator 108 in FIG. 4, either via line 119, when process 120 is implemented on the network or by processor 116 when the process is implemented thereon. As mentioned above, some of the concurrently running rules might be implemented on the network and some by processor 116.

Once virtual win generator 108 signals output mechanism 104 to drive display 106, the display, e.g., mechanical reels in the case of a mechanical slot machine, presents an outcome at 130 that provides an award of $3 according to the pay table of gaming device 92. In other words, the virtual win generator, having determined the value of the award, selects a game outcome that is associated with the determined value in the gaming device pay table. This award may be generated by applying it to the credit meter or otherwise giving it to the player in the same manner as if the gaming device pay table had produced a winning outcome. As a result, it appears to a player of gaming device 92 that he or she has won according the RNG and mapping process normally implemented by gaming device 92. The process then returns to 122 to wait for the next play.

Returning again to the rule implanted at 126, when the rule is checked and it is determined that the rule and/or condition implemented at 126 is not met, the process continues according to normal play of gaming device 92. At 132, numbers produced by RNG 94 are stored in registers 98. At 134 the outcome is mapped by map 100. Next, controller 102 signals output mechanism 104 to drive display 106 to present the randomly determined outcome at 136. If this outcome has an award associated with it according to the pay table of gaming device 92, it is generated at 138, such as by applying it to the credit meter or otherwise giving it to the player.

Figure 7:
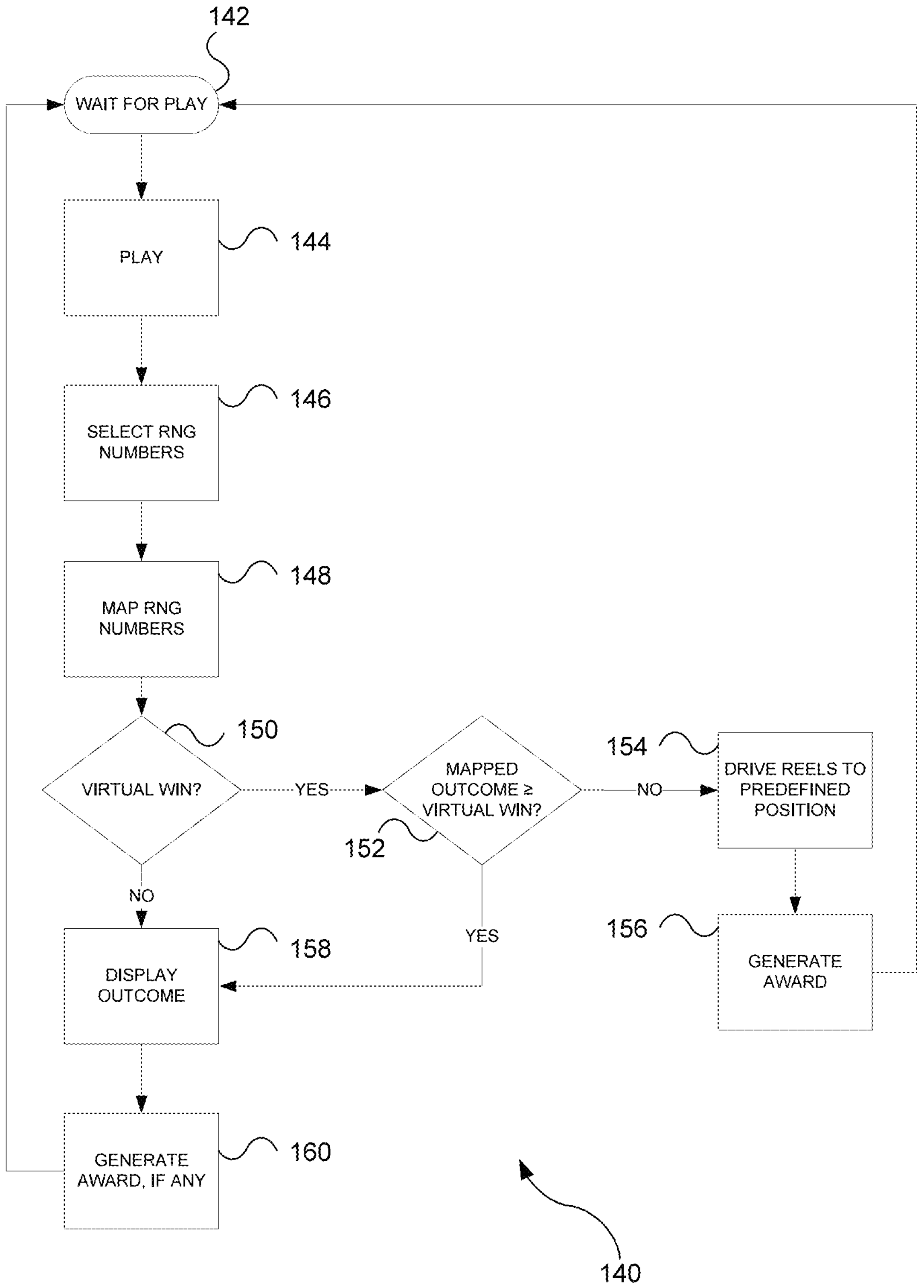
FIG. 7 is a second process for implementing the present invention.

Turning now to FIG. 7, indicated generally at 140 is another process for implementing an individual rule and/or condition. In process 140, gaming device 92 waits for play at 142. Once a player actuates play button 96 at 144, the process continues according to normal play of gaming device 92. At 146, numbers produced by RNG 94 are stored in registers 98. At 148 the outcome is mapped by map 100. Next, however, at 150, the process checks to see whether a virtual win will be provided according to any one of the rules or and/or conditions described above. As with process 120 in FIG. 6, process 140 implements a single rule that may be qualified by a condition such as time of day or whether the player is using a player tracking card. To illustrate using one of the rules referred to above, process 150 may check to see if there have been 10 consecutive games without a win, and if so to pay $5. Like all of the rules, this may be qualified depending upon a condition, such as whether the player is using a tracking card or the time of day, i.e., it may or may not be implemented or the number of consecutive games or amount paid could vary. In any event, regardless of the qualifications, or current loss or pay parameters implemented by the rule, if the conditions for generating a virtual win are determined to be met at 150, the process then checks at 152 to see if the mapped outcome at 148 is associated with an award that is greater than or equal to the amount determined by the current rule that is implementing the virtual win at 150. If not, i.e., the virtual win is greater than the win determined by gaming device 92, the reels are driven to a predefined position at 154 that is associated with a pay-table award that matches that determined by the rule implemented at 150. The award is generated at 156 and the process again waits for play at 142.

If, on the other hand, the mapped outcome is determined to be greater than or equal to the virtual win at 152, the outcome mapped at 148 is displayed at 158, and the corresponding pay table award is generated at 160. The process then waits for play at 142. In sum, process 140 checks to see if the next game outcome is going to provide an award as good as or better than the virtual win. If so, it skips the virtual win and simply provides the outcome and associated award determined by the pay table.

Figure 8:
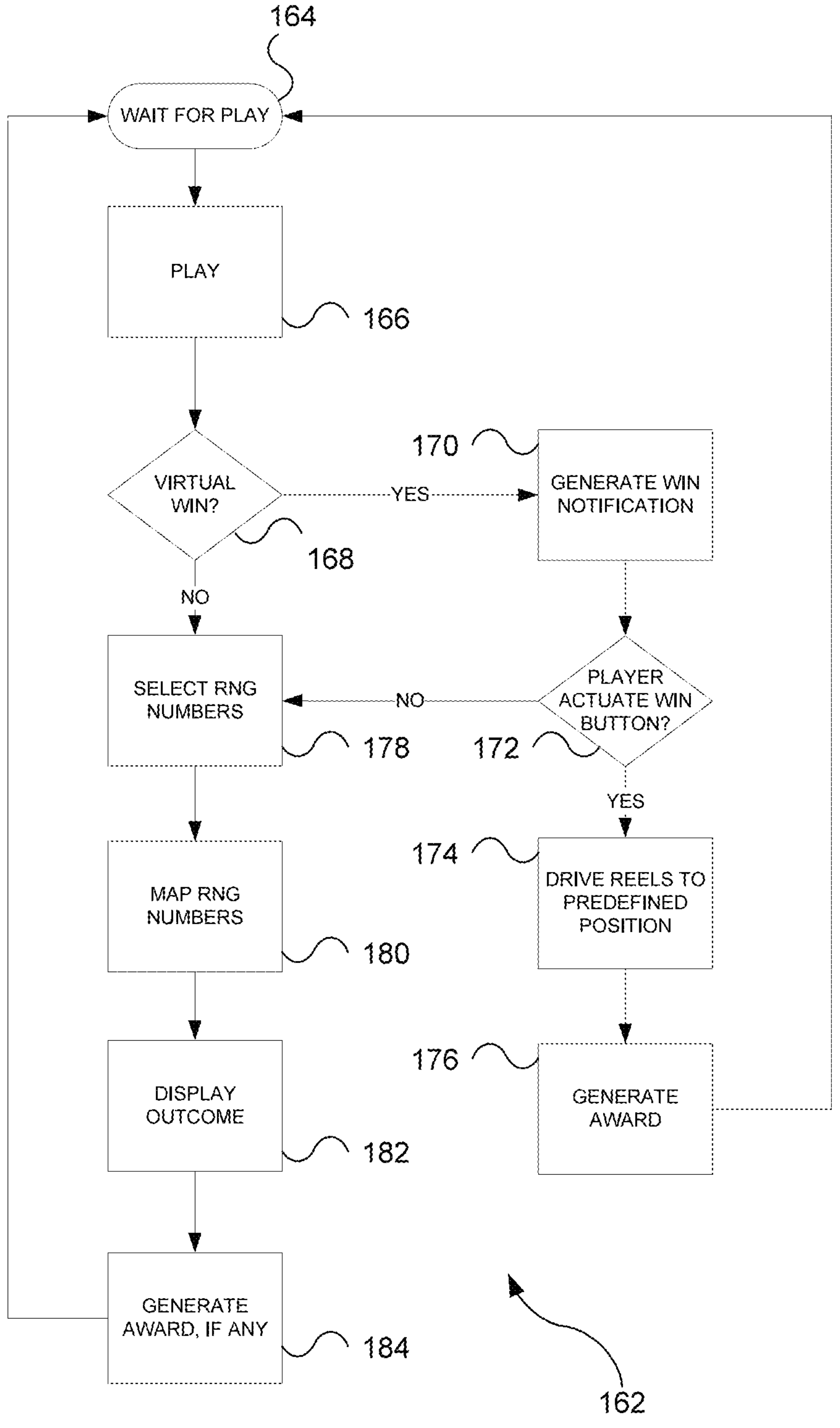
FIG. 8 is a third process for implementing the present invention.

Turning now to FIG. 8, another process for implementing any of the rules and/or conditions is indicated generally at 162. The process waits for play at 164. At 166, the player actuates play button 96. As with the previously described processes, process 162 implements a single rule that may be qualified by a condition such as time of day or whether the player is using a player tracking card. Whether the condition for the implemented rule and/or condition are met is determined at 168. If it is determined that the virtual win condition is met, process 162 generates a win notification at 170. Such a win notification could be generated as a message on secondary display 25 that informs the player that if he or she presses win button 112, they will collect a win. Any communication to the player could be used, such as a message on gaming display 20 or even an audible message. The communication could require the player to take a certain action within a predefined time to collect the virtual win award. For example, the message might say that the player is required to actuate win button 112 to collect an award. The process could provide this condition for 10 seconds. In other words, if the win button is not actuated within 10 seconds, the player loses the right to collect the award. As a result, if the player actuates win button 112 at 172, and does so within 10 seconds after win notification 170, the reels drive to a predefined position at 174 and the award provided by the rule implemented at 168 is generated at 176.

If, on the other hand, the player fails to actuate win button 112 at 172 within the allotted time, the process moves to 178 where numbers produced by RNG 94 are stored in registers 98. At 180 the outcome is mapped by map 100 with the mapped outcome being presented on display 106 at 182. Any award associated with that outcome in the gaming device pay table is generated at 184 and the process returns to wait for the next play at 164.

Figure 9:
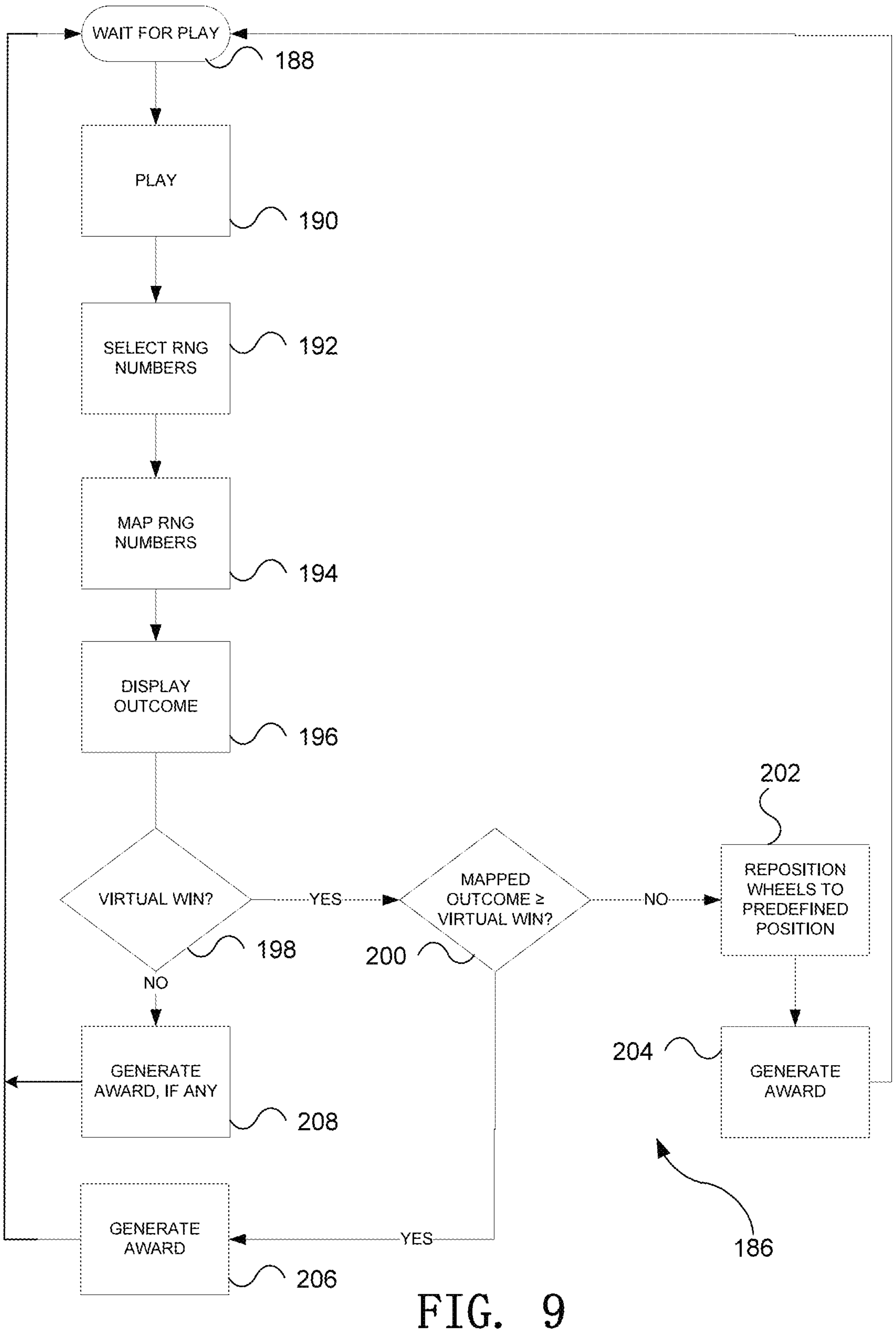
FIG. 9 is a fourth process for implementing the present invention.

Turning now to FIG. 9, indicated generally at 186 is still another process that could be used to implement any of the virtual win rules and/or conditions. The process waits for play at 188. When a player of gaming device 92 actuates play button 96 at 190, the gaming device captures RNG numbers in registers 98 at 192 and then maps those numbers using map 100 at 194. The resulting outcome is displayed at 196 in response to controller 102 driving outcome mechanism 104 to present the outcome on display 106. So far, this is relatively standard operation of gaming device 92 based on its RNG and associated pay table.

But at 198, after the outcome determined by the RNG is displayed, the rule and/or condition implemented by process 186 is checked to see if it is satisfied, i.e., if there is a decision to provide a virtual win based on the rule. If yes, at 200, process 186 checks to see if the outcome mapped at 194 is greater than or equal to the amount of the virtual win determined at 198. If no, at 202 virtual win generator 108 signals output mechanism 104 to drive display 106 to a different outcome than that displayed at 196. From the player's perspective, he or she may see a losing or low value outcome displayed momentarily, which then seemingly miraculously shifts to a winning or higher value outcome. This could also be implemented using the win button by requiring the player to depress the win button before the shift to a winning outcome occurs. At 204 the virtual award is generated and provided to the player in the same manner as a win according to a win that resulted from the RNG and mapping process associated with gaming device 92. Returning again to 200, if the mapped outcome is greater than or equal to the virtual win amount, the award associated with the outcome at 196 is generated at 206. The process then returns to wait for the next play at 188. Finally, if at 198 it is determined that the conditions for a virtual win have not been met, at 208 the process generates an award, if any, associated with the outcome mapped at 194, and returns to wait for the next play at 188.

Still other processes could be used to implement any of the rules and/or conditions. For example, although not depicted in the drawings, the gaming device could determine if a rule implementing a virtual win was satisfied at the conclusion of gaming-device play, i.e., after actuating the play button, selecting and mapping the random numbers and presenting the outcome. If the conditions for the virtual win were then met, the player could be informed, e.g., via secondary display 25 or otherwise, that the next play will produce a guaranteed win, namely that just determined by the virtual-win rule.

The accounting for the virtual wins could be provided for in a variety of ways. For example, all virtual win awards could be allocated to the casino's marketing budget. As a result, the payback percentage of each gaming device is not affected. Another way to fund virtual wins is to lower the payback percentage of some or all of the gaming machines and then accrue a fund that is a percentage of each wager made on a gaming device that provided a virtual win. This similarly leaves the payback percentage at a fixed, albeit lower, level than the first approach.

As mentioned above, actual payback percentage of each gaming device is tracked over time to measure performance and to detect possible malfunction. In a conventional gaming device, all pays made as a result of outcomes produced by the RNG are summed into a running total, sometimes referred to as "total credits out" meter. Further, all credits wagered are totaled by a "total credits in" meter. Total credits out divided by total credits in comprises the actual payback percentage of the gaming device. This number is compared to the theoretical payback percentage to see if the two agree.

Because the gaming device is random, there can be disagreement between the two over a small number of wagers. But as play accumulates, the actual payback percentage will converge on the theoretical payback percentage if the gaming device is functioning properly. If this doesn't happen, a casino manager will start checking to see if the game is not configured properly, if it is malfunctioning, or if someone is trying to cheat.

Credits paid on gaming machine 92 that result from virtual win generator 108 can throw off this calculation. This problem can be addressed in many ways. For example, the total credits out meter might not be incremented for any award that is paid in response to the virtual win generator. Alternatively, the total credits out meter could count all credits out, including those paid responsive to virtual win generator 108, and a separate meter could count all credits generated by virtual win generator 108. The operator can then add the two, if the total credit meter doesn't count virtual wins, or subtract the virtual win meter amount from the total credits out meter amount if the total credits meter counts virtual wins. Either way, the operator is provided with an accurate number to track actual payback of the gaming machine.

In addition, a computer-implemented process that monitors virtual win awards, including the number and amount, can be provided. If the awards move above a predefined level for a set period, the process can either change the amounts awarded according to the rules and/or conditions currently implemented by the processes described above. Alternatively, selected ones of the rules might be temporarily eliminated until the cumulative virtual awards were again reduced to a more feasible level. Any combination of first reducing or eliminating awards and then increasing or reestablishing such awards after the cumulative value is again within a predefined boundary could be implemented by such a process.

As can be seen, these rules and the processes implementing them can be used by a casino to provide gaming experiences tailored to a particular player or class of players. For example, players who are newly enrolled in the player tracking system might have rules directed only to them to ensure that the early gaming experiences at the casino are satisfying ones. And this also allows the casino to treat players of high value, either large bettors or regulars who consistently bet, with richer gaming experiences, which are likely to ensure player loyalty. And, as mentioned above, a casino might chose to provide a virtual win rule or rules that rewards players who do not use a player tracking card. For example, the casino might wish to implement a rule on each gaming machine that provides a virtual win after X number of losses. In other words, the casino might make a determination that it would not want any player to experience, e.g., 15 losses in a row without a win in a single gaming session.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. At least one non-transitory computer readable storage medium for use with at least one electronic gaming device that displays a first combination of symbols as a game outcome that is generated by a random process, the at least one non-transitory computer readable medium having computer executable instructions recorded thereon that, when executed by one or more hardware processors, cause the one or more hardware processors to:

determine a bonus award associated with at least one play actuation input on the electronic gaming device, the bonus award corresponding to an award that is associated with a symbol combination in a pay table that is used to determine symbol combinations and awards that result from game outcomes generated via the random process;

if the bonus award is less than an award associated a the game outcome that is generated by the random process, display only the first combination of symbols as the game outcome; and if the bonus award is greater than the award associated with the first combination of symbols in the pay table:

drive the gaming device to generate a second combination of symbols regardless of the random process; and provide a player of the electronic gaming device with the bonus award that corresponds to the award that is associated with the second combination of symbols in the pay table.

2. The at least one non-transitory computer readable storage medium of claim 1 wherein when the bonus award is greater than the award associated with the first combination of symbols in the pay table, the computer executable instructions further cause the gaming device to display the first combination of symbols and thereafter display the second combination of symbols.

3. The at least one non-transitory computer readable storage medium of claim 1 wherein the executable instructions further cause the one or more hardware processors to:

establish a preferred frequency of winning outcomes of the player of the electronic gaming device;

track the player's play;

determine the deviation of the frequency of winning outcomes in the tracked play from the player's preferred frequency; and drive the gaming device to generate the second combination of symbols as a function of the determined deviation.

4. The at least one non-transitory computer readable storage medium of claim 1 wherein the executable instructions further cause the one or more processors to determine the amount of the bonus award as a function of data associated with the player, the data being contained in a player tracking system.

5. At least one non-transitory computer readable storage medium for use with a game outcome generated by a random process, the at least one non-transitory computer readable medium having computer executable instructions thereon that, when executed by one or more hardware processors, cause the one or more hardware processors to:

determine a bonus award associated with at least one play actuation input, the bonus award corresponding to an award that is associated with a symbol combination in a pay table that is used to determine symbol combinations and awards that result from game outcomes via the random process;

if the bonus award is less than an award associated with a game outcome generated via the random process, display a first combination of symbols associated with the game outcome generated by the random process; and if the bonus award is greater than the award associated with the game outcome generated by the random process:

display a second combination of symbols; and provide the bonus award that is associated with the second combination of symbols in the pay table.

6. The at least one non-transitory computer readable storage medium of claim 5 wherein the executable instructions further cause the one or more hardware processors to:

receive a second play actuation input;

determine whether a player of a game that generated the game outcome is eligible to receive a bonus award; and if the player is not eligible:

generate one of a game winning outcome and a game losing outcome by the random process;

generate an award, if any, associated with the outcome generated by the random process;

display the generated outcome; and provide the award, if any, associated in the pay table with the outcome so generated.

7. The at least one non-transitory computer readable storage medium of claim 5 wherein the executable instructions further cause the one or more hardware processors to:

establish at least one criterion related to the frequency of occurrence of winning outcomes generated by the random process;

track the level of play of a player;

determine the deviation of the frequency of occurrence of winning outcomes in the tracked level of play from the established criterion; and determine that the player is eligible to receive a bonus as a function of the determined deviation.

8. The at least one non-transitory computer readable storage medium of claim 5 wherein the executable instructions further cause the one or more hardware processors to determine the amount of the bonus award as a function of data associated with a player, the data being contained in a player tracking system.

9. The at least one non-transitory computer readable storage medium of claim 5 wherein the executable instructions further cause the one or more hardware processors to:

establish a preferred value of at least one winning event of a player of a game that generated the game outcome;

track the level of a player;

determine the deviation of the value of at least one winning event in the tracked play from the player's preferred value; and display the second combination of symbols as a function of the determined deviation when the bonus award is greater than the award associated with the generated game outcome.

10. The at least one non-transitory computer readable storage medium of claim 5 wherein the executable instructions further cause the one or more hardware processors to receive an input from a player of a game that generated the game outcome prior to displaying the second combination of symbols when the bonus award is greater than the award associated with the generated game outcome.

11. The at least one non-transitory computer readable storage medium of claim 10 wherein the executable instructions further cause the one or more hardware processors to prevent the award from being collected if the player fails to generate the input within a predefined length of time.

12. The at least one non-transitory computer readable storage medium of claim 5 wherein the executable instructions further cause the one or more hardware processors to:

display the first combination of symbols; and change the displayed first combination of symbols to the second combination of symbols.

13. A method for operating a gaming device comprising:

receiving a first play actuation input;

determining a bonus award that corresponds to one of the awards in a pay table associated with the gaming device;

if the bonus award is less than an award associated with a game outcome generated by a random process, display a first combination of symbols generated by the random process;

if the bonus award is greater than the award associated with the game outcome generated by the random process, displaying a game winning outcome comprising a second combination of symbols that is different from the first combination of symbols; and provide an award associated with the displayed second combinations of symbols in the pay table.

14. The method of claim 13 further comprising:

receiving a second play actuation input;

determining whether a player of the gaming device is eligible to receive a bonus award responsive to receipt of the second play actuation input; and if the player is not eligible:

generate one of a game winning outcome and a game losing outcome by the random process;

display the generated outcome on a display associated with the gaming device; and provide an award, if any, associated in a pay table with the combination of symbols so generated.

15. The method of claim 13 further comprising:

establishing at least one criterion related to the frequency of occurrence of winning outcomes generated by the random process on the gaming device;

tracking the level of a player of the game;

determining the deviation of the frequency of occurrence of winning outcomes in the tracked level of play from the established criterion; and determining that the player is eligible to receive the bonus award as a function of the determined deviation.

16. The method of claim 13 further comprising determining the amount of the bonus award as a function of data associated with a player of the gaming device, the data being contained in a player tracking system.

17. The method of claim 13 further comprising:

establishing a preferred value of a player of the gaming device of at least one winning event;

tracking the level of the player's play;

determining the deviation of the value of at least one wining event in the tracked play from the player's preferred value; and displaying the second combination of symbols as a function of the determined deviation when the bonus award is greater than the award associated with the game outcome generated by the random process.

18. The method of claim 13 wherein the method further comprises requiring a player of the gaming device to generate an input to the gaming device prior to displaying the second combination of symbols when the bonus award is greater than the award associated with the game outcome generated by the random process.

19. The method of claim 18 wherein the method further comprises preventing the award from being collected if the player fails to generate the input within a predefined length of time.

20. The method of claim 13 further comprising:

displaying the game outcome generated by the random process; and changing the displayed game outcome generated by the random process to the second combination of symbols.

* * * * *